(12) United States Patent
Nishimura et al.

(10) Patent No.: US 7,114,948 B2
(45) Date of Patent: Oct. 3, 2006

(54) CLAMPING MECHANISM OF MOLDING MACHINE

(75) Inventors: Koichi Nishimura, Susono (JP); Yasuo Naito, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 78 days.

(21) Appl. No.: 10/798,304

(22) Filed: Mar. 12, 2004

(65) Prior Publication Data

US 2004/0180109 A1   Sep. 16, 2004

(30) Foreign Application Priority Data

Mar. 12, 2003   (JP) .............................. 2003-066690

(51) Int. Cl.
    *B29C 45/64*   (2006.01)
(52) U.S. Cl. .................... 425/589; 425/450.1; 425/595
(58) Field of Classification Search ................ 425/589, 425/595, 450.1, 451.9
See application file for complete search history.

(56) References Cited

U.S. PATENT DOCUMENTS

| | | | | |
|---|---|---|---|---|
| 3,642,403 A * | 2/1972 | Havlik | ........................ | 425/590 |
| 3,674,400 A | 7/1972 | Sauerbruch et al. | | |
| 4,781,568 A * | 11/1988 | Inaba | ........................ | 425/451 |
| 5,378,141 A * | 1/1995 | Aoki | ........................ | 425/589 |
| 6,626,658 B1 * | 9/2003 | Ito et al. | ...................... | 425/589 |
| 2003/0012843 A1 | 1/2003 | Yoda | | |
| 2003/0017230 A1 | 1/2003 | Yoshinaga et al. | | |

FOREIGN PATENT DOCUMENTS

| | | |
|---|---|---|
| DE | 196 08 135 A1 | 9/1997 |
| EP | 1 136 220 A2 | 9/2001 |
| JP | 8-258103 | 10/1996 |
| JP | 2587035 | 10/1998 |
| JP | 11-170322 | 6/1999 |
| JP | 3330578 | 7/2002 |

OTHER PUBLICATIONS

Chinese Office Action of Application No. 2004100387665 dated Jul. 22, 2005.

* cited by examiner

*Primary Examiner*—James P. Mackey
(74) *Attorney, Agent, or Firm*—Staas & Halsey LLP

(57) ABSTRACT

A clamping mechanism of a molding machine, including a bed; a stationary platen mounted on the bed, and carrying a stationary mold; a guide bar arranged fixedly relative to the stationary platen, and defining a longitudinal guiding axis; a first movable platen arranged movably relative to the stationary platen along the guiding axis, and carrying a movable mold; a support structure interposed between the guide bar and the first movable platen, and movably supporting the first movable platen on the guide bar along the guiding axis; a second movable platen separate from the first movable platen, and arranged movably relative to the stationary platen along the guiding axis; a connecting member connecting the first movable platen and the second movable platen to each other; and a drive section for applying a drive force to the second movable platen, to move the first movable platen and the second movable platen along the guiding axis. The support structure includes a spline engaging surface provided on the guide bar and a ball spline nut provided in the first movable platen, the ball spline nut being operatively engagable with the spline engaging surface.

14 Claims, 19 Drawing Sheets

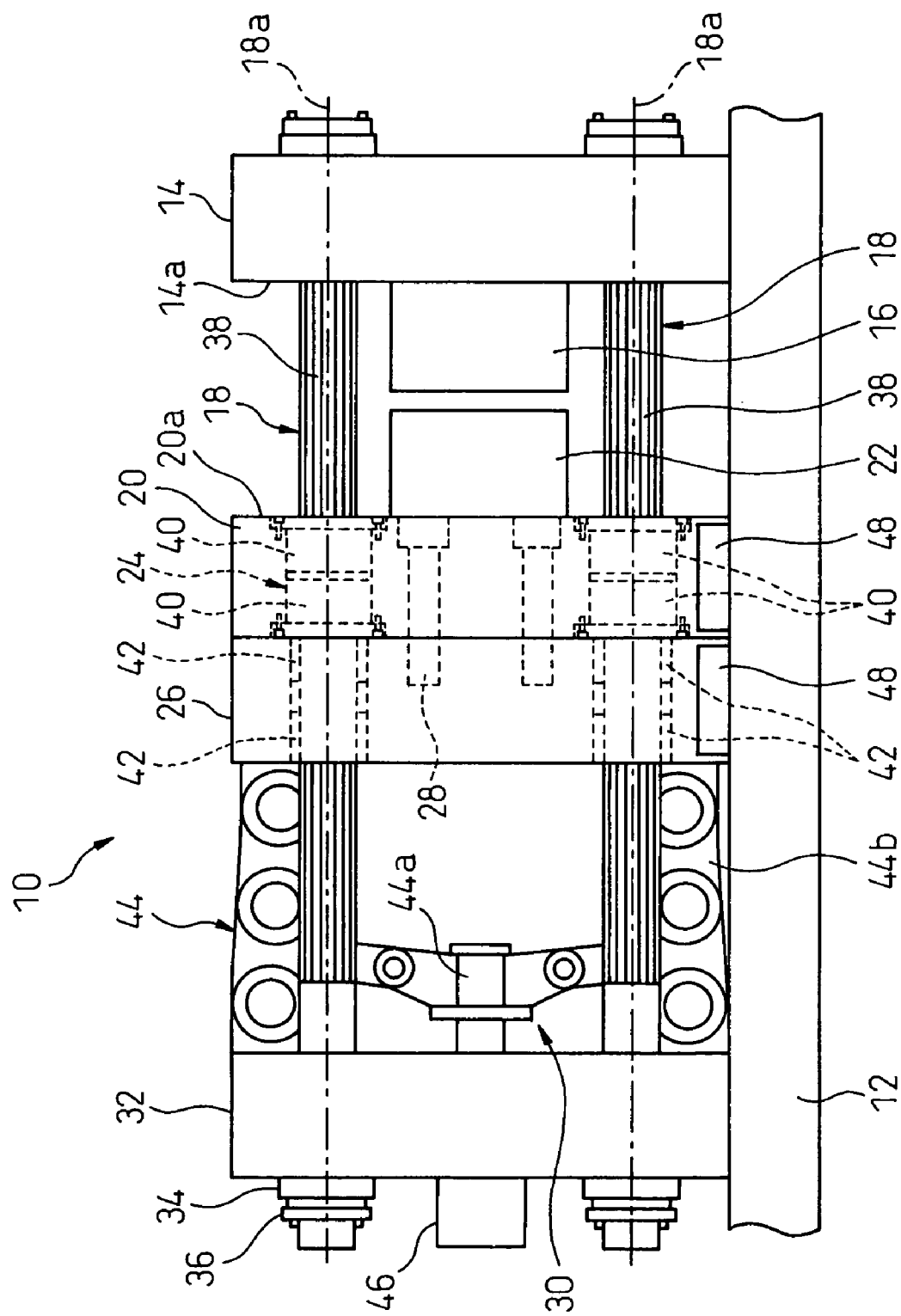

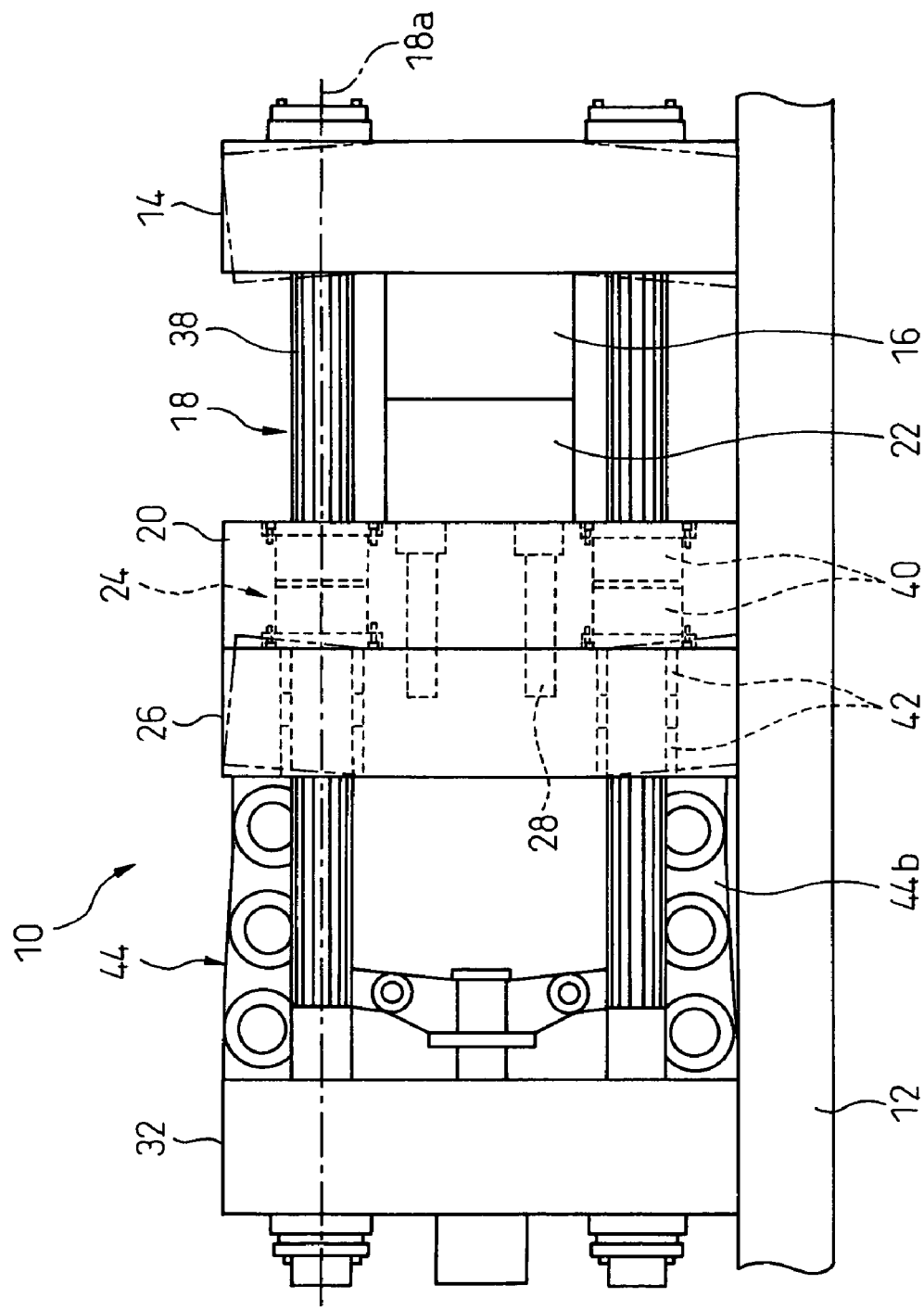

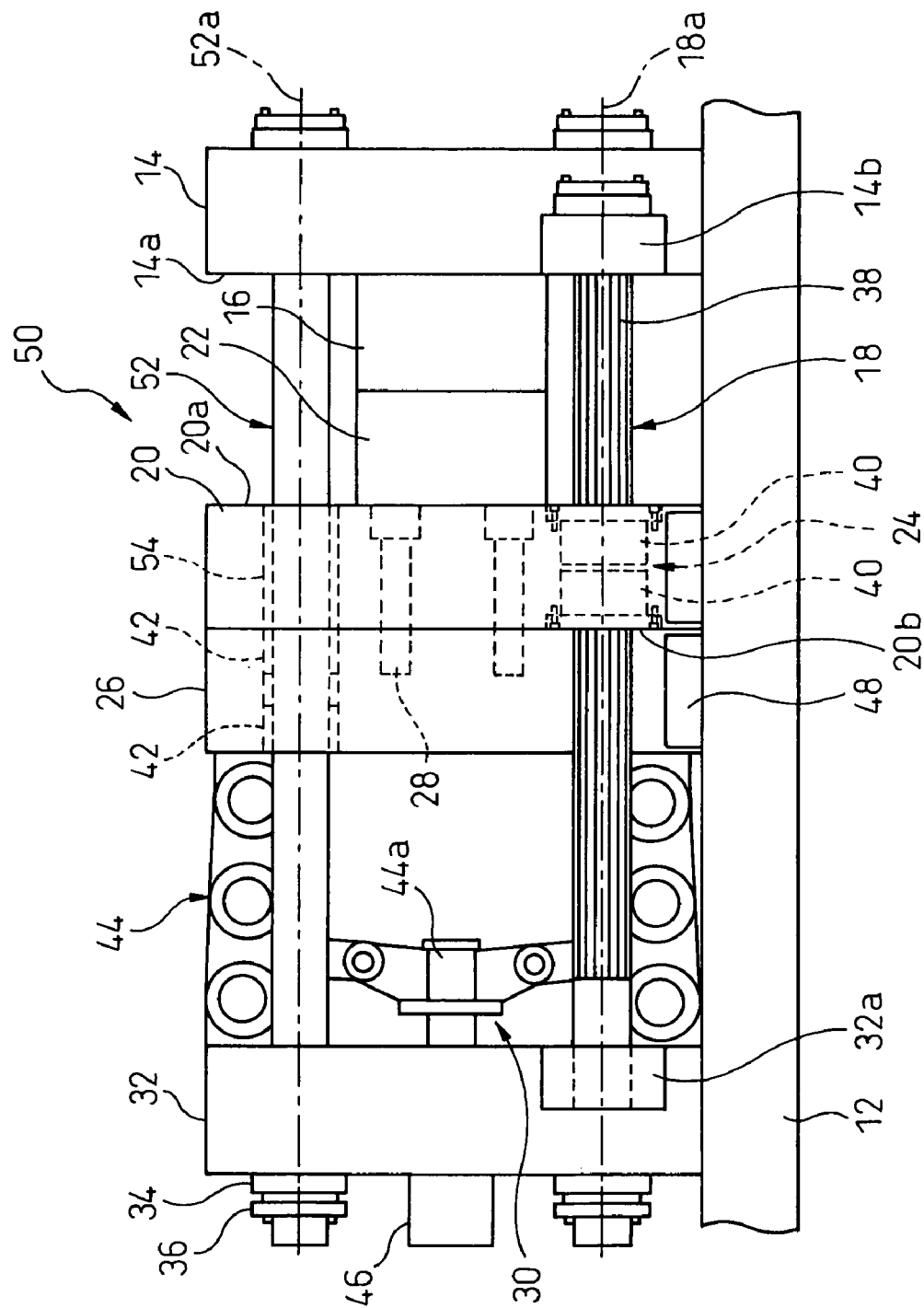

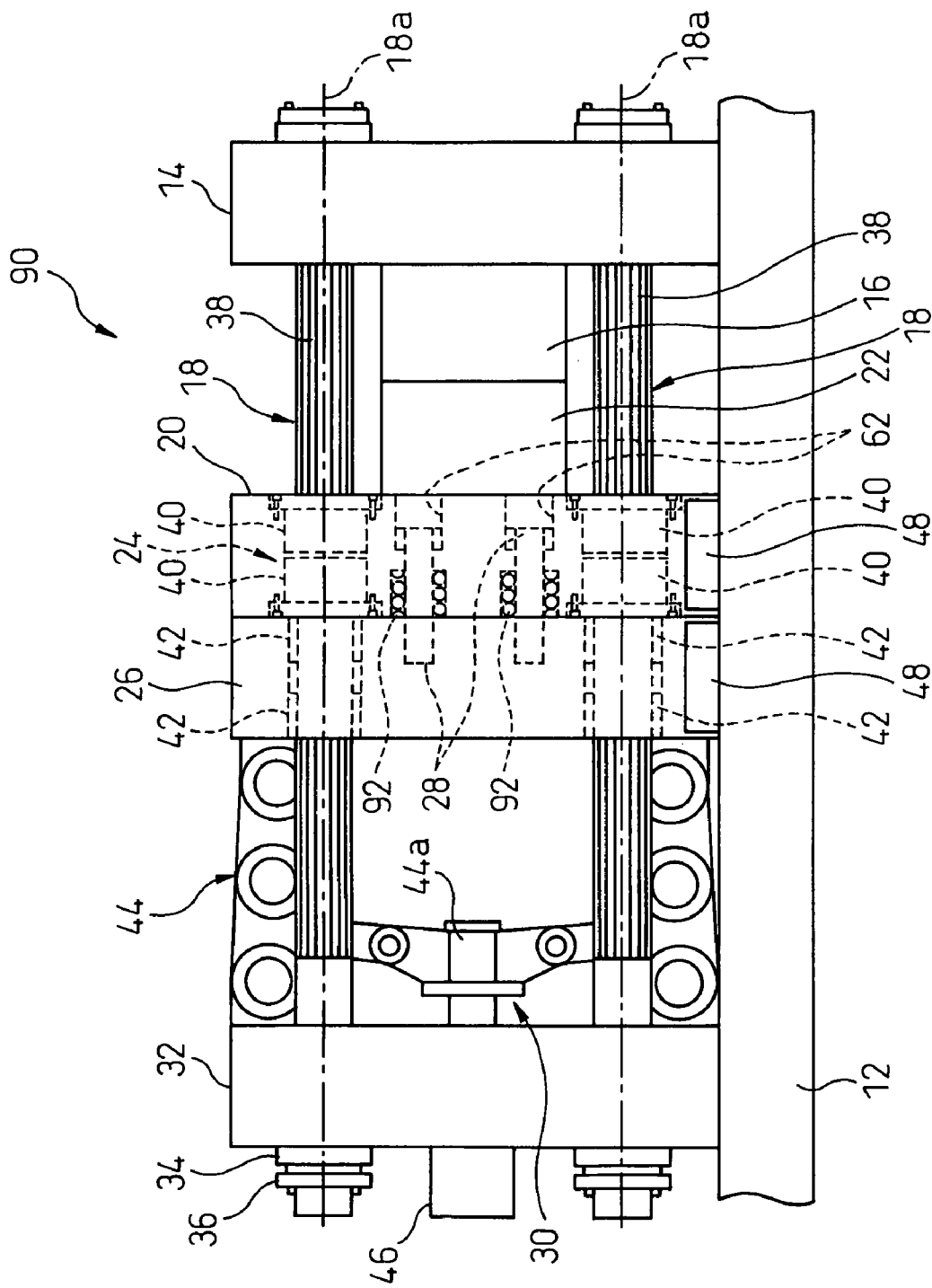

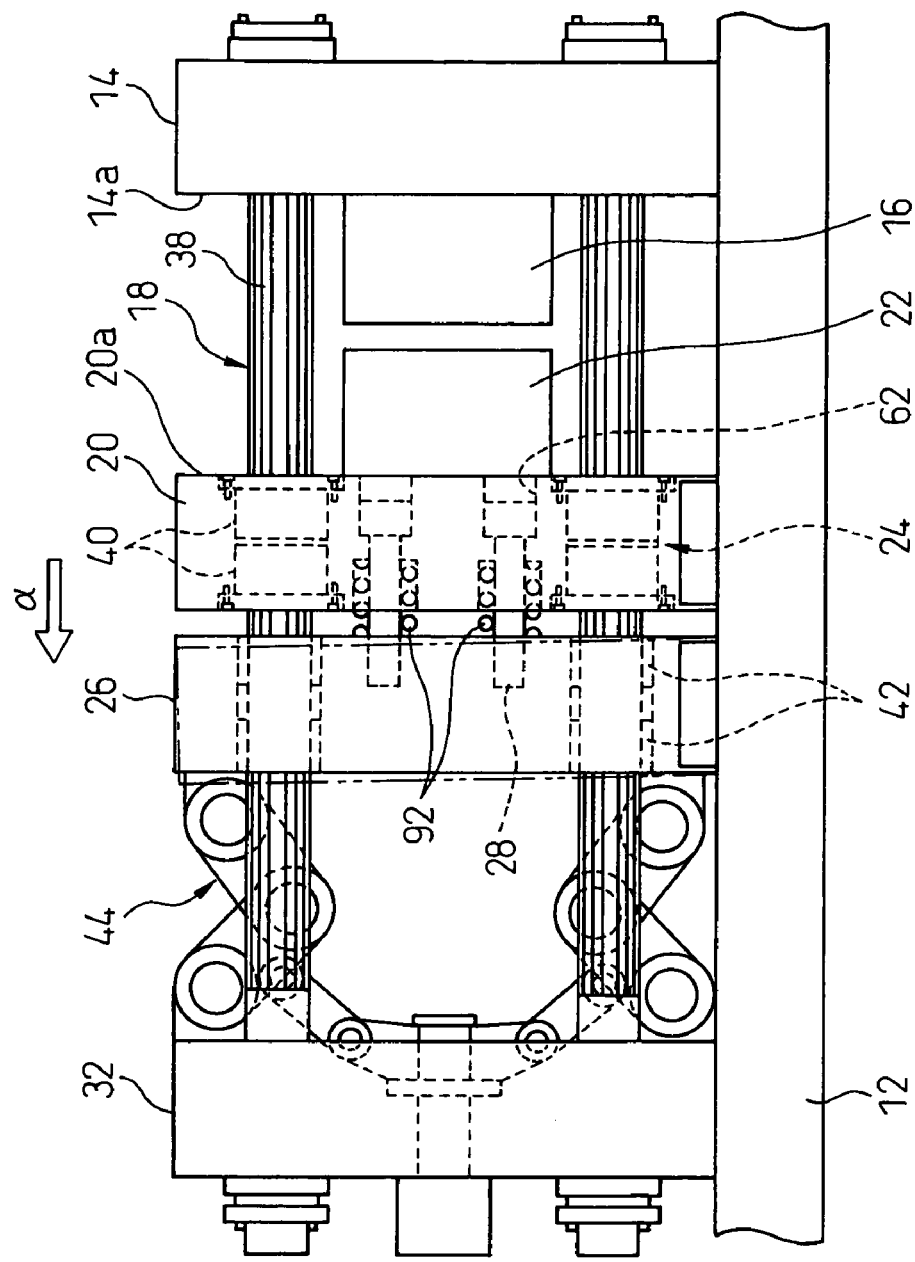

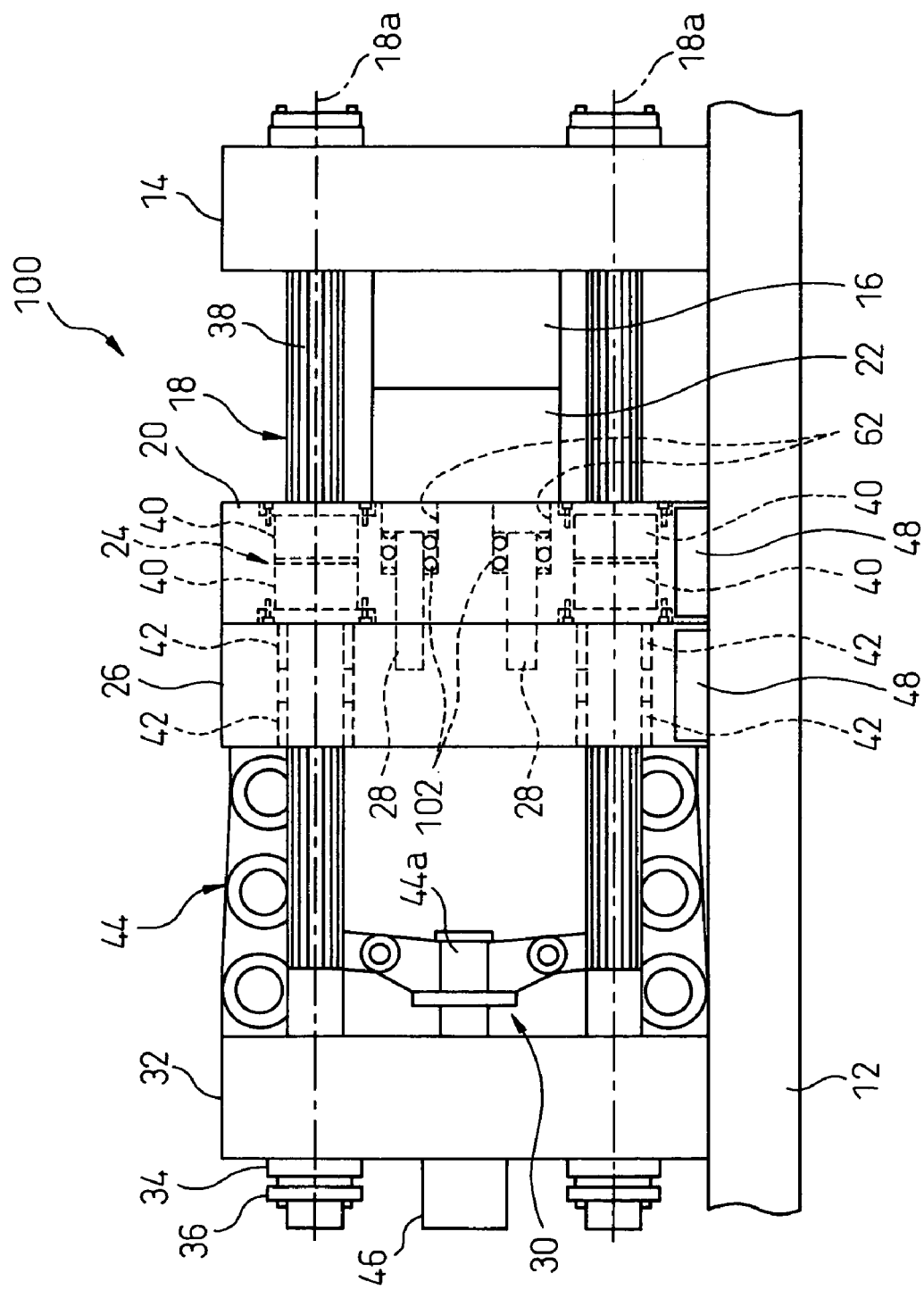

CLAMPING MECHANISM OF MOLDING MACHINE

BACKGROUND OF THE INVENTION

1. Field of the Invention

The present invention relates to a clamping mechanism of a molding machine.

2. Description of the Related Art

A conventional clamping mechanism of a molding machine (e.g., an injection molding machine) generally includes a stationary platen and an end frame (also referred to as a rear platen), both mounted upright on a bed of the molding machine, a plurality (normally, four) of tie bars bridging between the stationary platen and the end frame, a movable platen having through-holes individually receiving the tie bars and arranged movably along the tie bars between the stationary platen and the end frame, and a drive unit (e.g., a toggle unit) for driving the movable platen. A movable mold is attached to the movable platen, and a stationary mold is attached to the stationary platen. The drive unit including a drive source, such as an electric motor or a hydraulic cylinder, moves the movable platen, guided by the tie bars, whereby the molds are clamped. In general, a pair of sliding bearing bushes is disposed in each through-hole formed in the movable platen, and each tie bar slidably penetrates through the bushes.

In the conventional clamping mechanism as described above, the sliding bearing structure, used in a mutually sliding portion between the movable platen and each tie bar, inevitably creates a clearance between the inner circumferential surface of the bearing bush and the outer circumferential surface of the tie bar, which results in a play in the sliding bearing. Therefore, the movable platen is liable to tilt on the tie bars during a moving operation. As a result, there is a tendency that a predetermined degree of parallelism between the movable mold attached to the movable platen and the stationary mold attached to the stationary platen is deteriorated due to the moving operation of the movable paten. For example, in a mold opening process, if the parallelism between the molds is deteriorated at the instant when a mold release is caused by the separation of the movable mold from the stationary mold, the mold release timing of a molded article becomes irregular at certain points in the molding surface of the stationary or movable mold. In a case where a high-precision molded article, such as a lens, is to be molded, an irregularity in the mold release timing may result in a strain in the molded article, due to tensile stress, etc., and thus may produce a defective molded article.

In order to solve the above problem, a solution has been known, wherein a linear guide (an LM guide (trade name)) is arranged on the bed of the molding machine for guiding the travel of the movable platen, so that the movable platen is prevented from tilting and the parallelism between the movable platen and the stationary platen is maintained. In the solution using the linear guide, the movable platen is supported at the bottom end thereof by the linear guide, so that the tilting in the lower portion of the movable platen is suppressed, but it is difficult to suppress the tilting in the upper portion of the movable platen. Further, the linear guide can prevent the movable platen from turning about an axis in a moving direction of the movable platen (or an axial direction of the tie bar), but it is difficult for the linear guide to prevent the movable platen from turning about another axis perpendicular to the above axis and parallel with the mold attaching surface of the platen.

On the other hand, in a mold clamping process, the stationary platen and/or the movable platen may be deformed or strained due to a mutual pressing force applied to the stationary and movable molds. If the stationary platen and/or the movable platen is subjected to a strain, the mold-attaching surface of the platen may be deformed, which may also result in a deterioration of the parallelism between the stationary and movable molds and, thus, in a deterioration of a molding accuracy.

As a solution to prevent such a strain or deformation in the platen, for example, Japanese Utility Model Publication No. 2587035 (JP2587035Y2) discloses a clamping mechanism of an injection molding machine, wherein at least one of a stationary platen and a movable platen is provided, at an intermediate location as seen in a platen-thickness direction in the regions of tie-bar insertion holes formed at four corners of the platen, with a notch extending from the outer circumference of the platen to the tie-bar insertion holes. According to this arrangement, a pressing load applied to the molds is absorbed by a deformation in the notched region of the platen, and thus a deformation in the mold-attaching surface of the platen is prevented.

Also, Japanese Unexamined Patent Publication (Kokai) No. 8-258103 (JP8-258103A) discloses a clamping mechanism of an injection molding machine, wherein a support structure of the stationary platen is formed into a tapered shape, such as a rectangular pyramid or a truncated cone. According to this arrangement, a pressing load generated during a mold clamping is prevented from acting as a bending moment on the support structure, due to the tapered shape of the latter, so that a deflection or deformation in the support structure and the stationary platen is prevented.

Further, Japanese Unexamined Patent Publication (Kokai) No. 11-170322 (JP11-170322A) discloses a clamping mechanism of an injection molding machine, wherein a strain-preventing portion (such as a lateral edge channel) is provided, on the movable platen, between the pivot of the arm of a toggle mechanism and the mold-attaching surface. According to this arrangement, a pressing load generated during a mold clamping is absorbed by a deformation in the strain-preventing portion of the movable platen, and thus a deformation in the mold-attaching surface is prevented.

In the above conventional arts, a structure absorbing a pressing load generated during a mold clamping process is provided in the platen or the support structure thereof to prevent the platen from being strained during, especially, the mold clamping. In contrast, Japanese Patent Publication No. 3330578 (JP3330578B2) discloses a clamping mechanism of a molding machine, such as an injection molding machine, wherein a ball spline structure is adopted, in place of a sliding-bearing structure, to a guiding portion for the movable platen on the tie bar. According to this arrangement, a guide having the ball spline structure makes it possible for the movable platen to be always accurately translated (or perform a parallel displacement) relative to the stationary platen, so that a parallelism between the stationary mold and the movable mold during a mold opening process can be stably maintained. In this arrangement, it is required that the life of the ball spline structure is long even under the influence of a platen stress due to the pressing load during the mold clamping.

SUMMARY OF THE INVENTION

It is an object of the present invention to provide a clamping mechanism, of a molding machine, which can stably maintain, over a long period, the parallelism between a stationary platen and a movable platen in a mold clamping process as well as in a mold opening process.

To accomplish the above object, the present invention provides a clamping mechanism, of a molding machine, comprising a bed; a stationary platen mounted on the bed, and carrying a stationary mold; a guide bar arranged fixedly relative to the stationary platen, and defining a longitudinal guiding axis; a first movable platen arranged movably relative to the stationary platen along the guiding axis, and carrying a movable mold; a support structure interposed between the guide bar and the first movable platen, and movably supporting the first movable platen on the guide bar along the guiding axis; a second movable platen separate from the first movable platen, and arranged movably relative to the stationary platen along the guiding axis; a connecting member connecting the first movable platen and the second movable platen to each other; and a drive section for applying a drive force to the second movable platen, to move the first movable platen and the second movable platen along the guiding axis.

In the above clamping mechanism, it is advantageous that the support structure comprises a spline engaging surface provided on the guide bar and a ball spline nut provided in the first movable platen, the ball spline nut being operatively engagable with the spline engaging surface.

In this arrangement, the second movable platen may include a through-hole receiving the guide bar without engaging with the spline engaging surface.

The clamping mechanism may further comprise an end frame mounted on the bed at a location opposite to the stationary platen about the first and second movable platens, and the guide bar may comprise a tie bar tying the stationary platen to the end frame.

Alternatively, the clamping mechanism may further comprise an end frame mounted on the bed at a location opposite to the stationary platen about the first and second movable platens and a tie bar, separate from the guide bar, defining a second longitudinal guiding axis generally parallel to the guiding axis of the guide bar, the tie bar tying the stationary platen to the end frame.

In this arrangement, the first movable platen may include a first through-hole independent of the ball spline nut and extending along the second guiding axis, the second movable platen may include a second through-hole aligned along the second guiding axis with the first through-hole, and the tie bar may be received in the first and second through-holes.

It is also advantageous that the connecting member connects the first and second movable platens in a manner in which they are shiftable, along the guiding axis, relative to each other.

In this arrangement, it is preferred that the clamping mechanism further comprises a biasing member interposed between the first and second movable platens, the biasing member elastically biasing the first and second movable platens away from each other along the guiding axis.

It is also preferred that the clamping mechanism further comprises a biasing member interposed between the first and second movable platens, the biasing member elastically biasing the first and second movable platens toward each other along the guiding axis.

It is also advantageous that the first movable platen is made from a material having a rigidity higher than that of the second movable platen.

BRIEF DESCRIPTION OF THE DRAWINGS

The above and other objects, features and advantages of the present invention will become more apparent from the following description of preferred embodiments in connection with the accompanying drawings, wherein:

FIG. 1 is a schematic front view showing a clamping mechanism according to a first embodiment the present invention;

FIG. 2 is a schematic front view showing the clamping mechanism of FIG. 1 in a mold clamping state;

FIG. 3 is a schematic front view showing a clamping mechanism according to a second embodiment the present invention;

FIG. 13 is a schematic front view showing the clamping mechanism according to the sixth embodiment of the present invention;

FIG. 14 is a schematic front view showing the clamping mechanism of FIG. 13 in a mold opening state;

FIG. 16 is a schematic front view showing the clamping mechanism according to the seventh embodiment of the present invention;

DETAILED DESCRIPTION

Figure 4A:
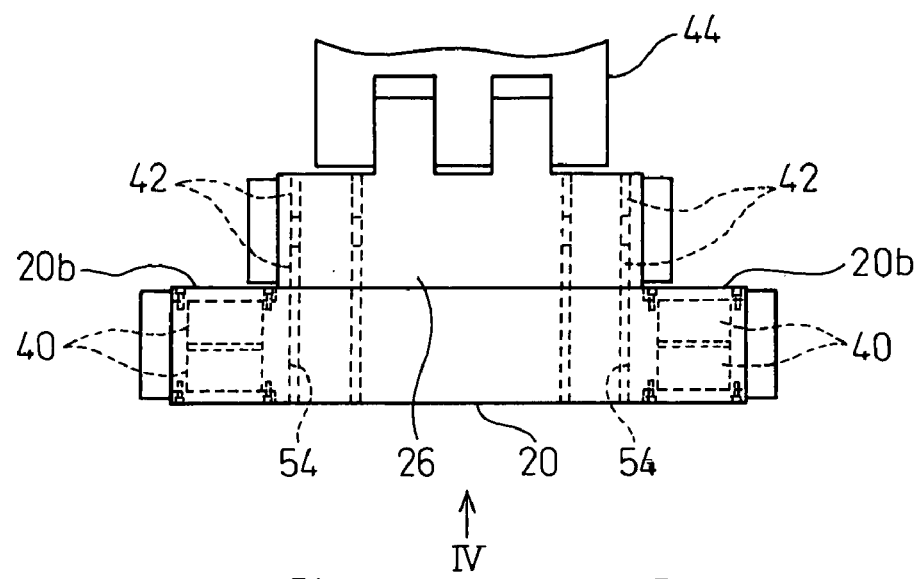
FIG. 4A is a schematic top plan view showing first and second movable platens in the clamping mechanism of FIG. 3.

The embodiments of the present invention are described below in detail, with reference to the accompanying drawings. In the drawings, the same or similar components are denoted by common reference numerals.

The basic concepts of a clamping mechanism of a molding machine according to the present invention are directed to a first mode wherein an auxiliary movable platen (referred to as a first movable platen in this application) is arranged between a movable platen linked to a drive section (referred to as a second movable platen in this application) and a movable mold, and a ball spline structure is provided as a guide/support structure for the first movable platen, as well as a second mode wherein the first and second movable platens are engaged with each other while ensuring a play or a mutual displacement, by using a connecting member. According to the above basic concepts, it is effected that the parallelism between the fixed platen and the first movable platen, respectively carrying molds, is maintained, and that a reduction in the life of the ball spline structure, due to an uneven load distribution axially along a ball spline nut, is prevented.

Referring to the drawings, FIGS. 1 and 2 show a clamping mechanism 10 of a molding machine, according to a first embodiment realizing the above-described first concept of the present invention. The clamping mechanism 10 includes a bed 12; a stationary platen 14 mounted on the bed 12, and carrying a stationary mold 16; a guide bar 18 arranged fixedly relative to the stationary platen 14, and defining a longitudinal guiding axis 18a; a first movable platen 20 arranged movably relative to the stationary platen 14 along the guiding axis 18a, and carrying a movable mold 22; a support structure 24 interposed between the guide bar 18 and the first movable platen 20, and movably supporting the first movable platen 20 on the guide bar 18 along the guiding axis 18a; a second movable platen 26 separate from the first movable platen 20, and arranged movably relative to the stationary platen 14 along the guiding axis 18a; a connecting member 28 connecting the first movable platen 20 and the second movable platen 26 to each other; and a drive section 30 for applying a drive force to the second movable platen 26, to move the first movable platen 20 and the second movable platen 26 along the guiding axis 18a. The clamping mechanism 10 further includes an end frame 32 mounted on the bed 12 at a location opposite to the stationary platen 14 about the first and second movable platens 20, 26.

The guide bar 18 is structured as a tie bar 18 tying the stationary platen 14 and the end frame 32 to each other. In the illustrated embodiment, the mutually opposing surfaces of the stationary platen 14 and of the end frame 32, both uprightly provided on the bed 12, are of rectangular profiles, and four tie bars 18 are arranged respectively at the four corners of the opposing surfaces (FIG. 1 illustrates only two tie bars 18).

Each tie bar 18 is secured at one end to the stationary platen 14 by a fastening element such as a nut, and is attached at the other end to the end frame 32 through a mold-thickness adjusting nut 34 in a relatively shiftable manner. Pinions 36 are secured respectively to the mold-thickness adjusting nuts 34, and a chain (not shown) is wrapped around the pinions 36 provided respectively to the four tie bars 18. When the chain is driven by a not-shown drive source for a mold-thickness adjustment so as to synchronously rotate the nuts 34 of the tie bars 18, the end frame 32 is shifted on the bed 12 along the tie bars 18. Thereby, the distance between the end frame 32 and the stationary platen 14 is adjusted, and it is thus possible to adjust a clamping force depending on the thickness of the molds as used.

Each tie bar (a guide bar) 18 is received, in a relatively movable manner, in through-holes formed in both the first movable platen 20 and the second movable platen 26 in such a manner as to be aligned with each other along the guiding axis 18a. Each tie bar 18 is provided with a spline engaging surface 38 formed by plural ribs or grooves extending along the guiding axis 18a, at least over a predetermined surface area over which the first movable platen 20 slides along the tie bar 18. In other words, the tie bar 18 functions as a spline shaft over the area provided with the spline engaging surface 38. On the other hand, each through-hole in the first movable platen 20 for receiving the tie bar 18 is provided with a ball spline nut 40 operatively engagable with the spline engaging surface 38 of the tie bar 18. The spline engaging surface 38 on the tie bar 18 and the corresponding ball spline nut 40 in the first movable platen 20 cooperate with each other to constitute the support structure 24. In the illustrated embodiment, a pair of ball spline nuts 40 is provided in each through-hole of the first movable platen 20.

In contrast, each through-hole in the second movable platen 26 for receiving the tie bar 18 is provided with a sliding bearing bush 42 which is not engagable with the spline engaging surface 38 on the tie bar 18. Each sliding bearing bush 42 slidably receives the corresponding tie bar 18 through a slight clearance therebetween, whereby the second movable platen 26 is guided along the guiding axis 18a. In the illustrated embodiment, a pair of sliding bearing bushes 42 is provided in each through-hole of the second movable platen 26. Also, instead of using the sliding bearing bushes 42, the inner diameter of each through-hole of the second movable platen 26 may be selected to be larger than the outer diameter of the tie bar 18 so that the through-hole of the second movable platen 26 can receive the tie bar 18 in a non-contact manner.

The connecting member 28 is formed from a fastening element such as a bolt, and locally fixes the first movable platen 20 to the second movable platen 26 at the position of the connecting member 28. In the illustrated embodiment, two connecting members 28 are provided at locations in proximity with the centers of the respective movable platens 20, 26. The local fixation of the connecting member 28 serves to permit the mutual abutting surfaces of the movable platens 20, 26 to slightly slide relative to each other when the movable platens 20, 26 are deflected.

The drive section 30 includes a toggle unit 44 arranged between the end frame 32 and the second movable platen 26, and a drive source 46, such as a servo motor, for driving a cross head 44a of the toggle unit 44. The toggle unit 44 and the drive source 46 are mounted on the end frame 32, and a pair of arms 44b of the toggle unit 44 are joined at their distal ends to the top and bottom areas of the second movable platen 26, respectively.

The stationary mold 16 and the movable mold 22 are attached respectively to the mutually opposing mold-attaching surfaces 14a, 20a of the stationary platen 14 and the first movable platen 20. When the drive source 46 is actuated to drive the toggle unit 44, so as to move the second movable platen 26 and the first movable platen 20 along the tie bars 18 in the direction of guiding axis 18a, the molds 16, 22 are operated to open or close (a mold opening or clamping operation).

FIG. 2 illustrates a mold clamping state. Under a clamping force applied from the driving section 30, the second movable platen 26 and the stationary platen 14 are slightly deformed as typically shown by broken lines. In this connection, the second movable platen 26 is directly linked to the toggle unit 44, so that the strain or deformation thereof becomes greater. In contrast, the first movable platen 20 is not directly linked to the toggle unit 44 and the second movable platen 26 is interposed therebetween, so that the strain or deformation of the first movable platen 20 is relieved, with the aid of the slight sliding between the mutual abutting surfaces of the movable platens 20, 26 as described. Therefore, during the mold clamping state, the strain of the mold attaching surface 20a of the first movable platen 20 is suppressed and, thus, it is possible to prevent the parallelism between the mold attaching surfaces 14a, 20a, of the stationary platen 14 and the first movable platen 20, from being deteriorated.

Further, in a condition where the stationary mold 16 is not in contact with the movable mold 22 during the mold opening state, the second movable platen 26 linked to the toggle unit 44 is liable to be deformed or strained under the influence of the production error of the toggle mechanism and/or the weight thereof. According to the clamping mechanism 10, it is also possible, during the mold opening state, to prevent the strain in the second movable platen 26 from being transferred to the first movable platen 20, and thus to maintain the parallelism between the mold attaching surfaces 14a, 20a of the stationary platen 14 and the first movable platen 20 as well as the parallelism between the stationary mold 16 and the movable mold 22.

Also, in the clamping mechanism 10, the support structure 24 between the first movable platen 20 and the tie bars (or guide bars) 18 is constituted by a ball spline structure as already described. In the usual ball spline structure, there is almost no clearance between a spline shaft and a ball spline nut, because a plurality of balls are engaged with the spline engaging surface (e.g., a ball rolling groove) of the spline shaft under a certain pressure. The support structure 24 adopting such a ball spline structure serves to substantially eliminate a play between the tie bar 18 and the first movable platen 20.

Moreover, in the illustrated embodiment, the tie bars 18 are received, over the spline shaft length (or the spline engaging surface 38) thereof, in the ball spline nuts 40 provided at four corners of the first movable platen 20, so that it is possible to effectively prevent the first movable platen 20 from being tilted. In other words, the first movable platen 20 is bound on the four tie bars 18 through the ball spline structure, which makes it possible for the first movable platen 20 to be always accurately translated (or perform a parallel displacement) relative to the stationary platen 14, without causing a rotation of the first movable platen about the guiding axis 18a as well as respective rotations thereof about vertical and horizontal axes perpendicular to the guiding axis 18a. It should be noted that such a rotation inhibiting effect can be obtained by not only the above configuration using four tie bars 18 but also the other configuration using at least two tie bars 18 located along a diagonal line.

Accordingly, the mold attaching surfaces 14a, 20a of the stationary platen 14 and the first movable platen 20 are maintained in parallel at all times including the mold clamping and opening states, and also the molding surfaces of the stationary and movable molds 16, 22 attached respectively to the mold attaching surfaces 14a, 20a are maintained in a proper positional correlation. Particularly, in a mold release step, it is possible to effectively prevent the mold release timing of a molded article from becoming irregular at certain points in the molding surfaces. As a result, it is possible to surely prevent the molded article from being subjected to a strain due to an irregular or non-uniform mold-release timing, and thus to extremely favorably produce a high-precision article such as a lens.

Besides, in addition to the provision of the above-described ball spline structure for the support structure 24, the strain in the first movable platen 20 carrying the movable mold 22 is relieved because the first movable platen 20 is indirectly linked to the toggle unit 44, as already described, so that it is possible to eliminate the disadvantage that the ball spline nut 40 provided in the first movable platen 20 comes into contact with the spline engaging surface 38 of the corresponding tie bar 18 under a non-uniformly distributed load along the guiding axis 18a. As a result, it is possible to significantly increase the life of the spline engaging surface 38 of the tie bar 18 as well as of the ball spline nut 40.

In the above-described configuration, the first and second movable platens 20, 26 connected to each other can be made from materials different from each other. In particular, it is advantageous that the first movable platen 20 is made from a material having a rigidity higher than the rigidity of material of the second movable platen 26. In this connection, a material having high rigidity means that the material has a large modulus of longitudinal elasticity. For example, in the case where the second movable platen 26 is made from a gray cast iron or a spheroidal graphite cast iron, the first movable platen 20 can be made from a material having about twice modulus of longitudinal elasticity of the former materials, such as a rolled steel for general structures, a carbon steel for general structures or an alloy steel for general structures.

The second movable platen 26 has a relatively complex structure due to, e.g., the provision of the toggle unit 44 linked thereto. In general, a material having high rigidity (or a large modulus of longitudinal elasticity) is difficult to process, which may result in the increase in a production cost, so that it is advantageous to make the second movable platen 26 from a material having a lower rigidity facilitating a casting process. On the other hand, the first movable platen 20 has a relatively simple structure and does not require complex machining. Therefore, the first movable platen 20 can be made from a material having high rigidity, without increasing the production cost. As a result, it is possible to further effectively relieve the strain in the first movable platen 20, which makes it possible to stably maintain the parallelism between the stationary and movable molds 16, 22, and thus to increase the life of the ball spline structure.

It should be noted that, in the above embodiment, the number of the ball spline nuts 40 provided in each tie-bar receiving through-hole of the first movable platen 20 is not limited to two as illustrated, but may be one or three or more. As a ball-spline engaging length is increased by, e.g., increasing the number of the ball spline nuts 40, the effect of inhibiting the tilt or rotation of the first movable platen 20 is improved, which further stabilizes the translation or parallel displacement of the first movable platen 20.

Further, the first and the second movable platens 20, 26 may be mounted on the base 12 through known platen supports 48 (FIG. 1), so as to positively adjust the tilting of the movable platens 20, 26 by using the platen supports 48. The platen support 48 may have a construction as disclosed in, for example, U.S. Pat. No. 3,674,400 issued Jul. 4, 1972 to Sauerbruch et al., the teachings of which are hereby incorporated by reference.

FIG. 3 shows a clamping mechanism 50 according to a second embodiment realizing the first concept of the present invention. The clamping mechanism 50 of the second embodiment has a configuration substantially identical to the clamping mechanism 10 of the first embodiment, except for the provisions of a tie bar and a guide bar, separate from each other, and of a ball spline structure only for the guide bar.

Therefore, corresponding components are denoted by common reference numerals and the detailed descriptions thereof are not repeated.

The clamping mechanism 50 includes a guide bar 18 arranged fixedly relative to a stationary platen 14; a support structure 24 having a ball spline structure and movably supporting a first movable platen 20 on the guide bar 18 along the guiding axis 18a thereof; and a tie bar 52, separate from the guide bar 18, defining a second longitudinal guiding axis 52a generally parallel to the guiding axis 18a, the tie bar 52 tying the stationary platen 14 and an end frame 32 to each other.

In the illustrated embodiment, the mutually opposing surfaces of the stationary platen 14 and of the end frame 32 have rectangular profiles, and four tie bars 52 are arranged respectively at the four corners of the opposing surfaces. In the same way as the tie bar 18 of the first embodiment, each tie bar 52 is secured at one end to the stationary platen 14, and is attached at the other end to the end frame 32 through a mold-thickness adjusting nut 34 in a relatively shiftable manner. Two guide bars 18 are arranged respectively at locations laterally outside a pair of tie bars 52 disposed along a diagonal line. Each guide bar 18 is secured at one end to the lateral extension 14b of the stationary platen 14, and is slidably supported at the other end on the lateral extension 32a of the end frame 32.

Figure 4B:
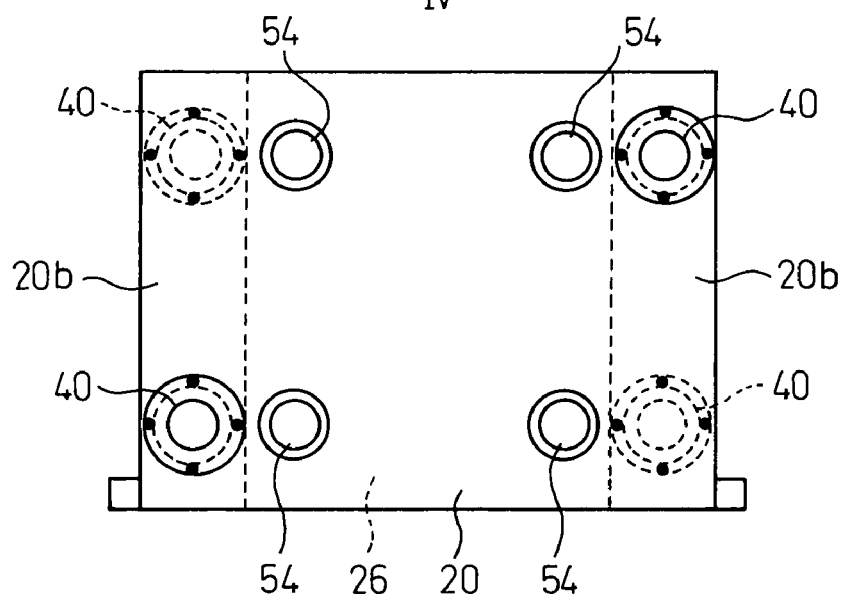
FIG. 4B is a side view showing the first and second movable platens of FIG. 4A along an arrow IV.

Each guide bar 18 is received, in a relatively movable manner, in a through-hole formed in the lateral extension 20b of the first movable platen 20. Each guide bar 18 is provided with a spline engaging surface 38 formed by plural ribs or grooves extending along the guiding axis 18a, at least over a predetermined surface area over which the first movable platen 20 slides along the guide bar 18. In other words, the guide bar 18 functions as a spline shaft over the area provided with the spline engaging surface 38. On the other hand, as shown in FIGS. 4A and 4B, each through-hole in the first movable platen 20 for receiving the guide bar 18 is provided with a ball spline nut 40 operatively engagable with the spline engaging surface 38 of the guide bar 18. The spline engaging surface 38 on the guide bar 18 and the corresponding ball spline nut 40 in the first movable platen 20 cooperate with each other to constitute the support structure 24. In the illustrated embodiment, a pair of ball spline nuts 40 is provided in each through-hole of the first movable platen 20.

Each tie bar 52 is received, in a relatively movable manner, in through-holes formed in both the first movable platen 20 and the second movable platen 26 in such a manner as to be aligned with each other along the guiding axis 52a. Each tie bar 52 is a rod member having a substantially smooth outer-circumferential surface. As shown in FIGS. 4A and 4B, each through-hole in the second movable platen 26 for receiving the tie bar 52 is provided with a sliding bearing bush 42, in the same way as the first embodiment. Each sliding bearing bush 42 slidably receives the corresponding tie bar 52 through a slight clearance therebetween, whereby the second movable platen 26 is guided along the guiding axis 52a. On the other hand, the first movable platen 20 receives the tie bars 52 in respective through-holes 54 in a non-contact manner, the inner diameter of each through-hole 54 being larger than the outer diameter of tie bar 52.

Thus, in the clamping mechanism 50, the first movable platen 20 is supported on the guide bars 18 through the support structure 24 having the ball spline structure, while the second movable platen 26 is engaged with the tie bars 52 through the sliding bearing bushes 42, and both movable platens 20, 26 are moved along the guiding axis 18a (52a) by the driving operation of a drive section 30. It will be appreciated that the clamping mechanism 50 having the above configuration possesses characteristic effects substantially identical to those of the clamping mechanism 10 of the first embodiment. Further, in the clamping mechanism 50, the guide bars 18 are provided separately from the tie bars 52, so that the function of the guide bars 18 and the support structure 24 having the ball spline structure, for maintaining the parallelism of the first movable platen 20, is effected separately from the tie bars 52. As a result, it is possible to prevent the strain or deformation in the tie bars 52, resulted from, e.g., a stress due to the drive section 30, from being transferred to the first movable platen 20, and thus improve the effect of inhibiting the tilt or rotation of the first movable platen 20, which further stabilizes the translation or parallel displacement of the first movable platen 20. Moreover, it is possible to further increase the life of the ball spline structure.

Although, in the illustrated embodiment, two guide bars 18 arranged along a diagonal line are used, the present invention is not limited thereto, but additional guide bars 18 arranged along another diagonal line may be used. In this arrangement, the ball spline nuts 40 are also provided at the other two corners of the first movable platen 20, as shown by broken lines in FIG. 4B. Further, the guide bar 18 is not restricted to the illustrated configuration bridging between the stationary platen 14 and the end frame 32, but may be provided separately from both the stationary platen 14 and the end frame 32.

Although, the respective embodiments as described above are directed to the configuration wherein the toggle unit 44 is used in the drive section 30, the characteristic arrangements of the present invention may also be applied to a clamping mechanism including a direct-pressurizing drive section wherein the first and second movable platen 20, 26 are directly driven by the drive source 46 such as a hydraulic cylinder or a servo motor, without using the toggle unit 44. It will be appreciated that, in this configuration, characteristic effects equivalent to those of the respective embodiments can also be obtained.

FIGS. 5A to 7 show a clamping mechanism 60 according to a third embodiment realizing the second concept of the present invention. The clamping mechanism 60 of the third embodiment has a configuration substantially identical to the clamping mechanism 10 of the first embodiment, except that the support structure supporting the first movable platen is formed from a sliding bearing structure, and that the first and second movable platens are mutually shiftably connected to each other by the connecting member. Therefore, corresponding components are denoted by common reference numerals and the detailed descriptions thereof are not repeated.

Figure 6:
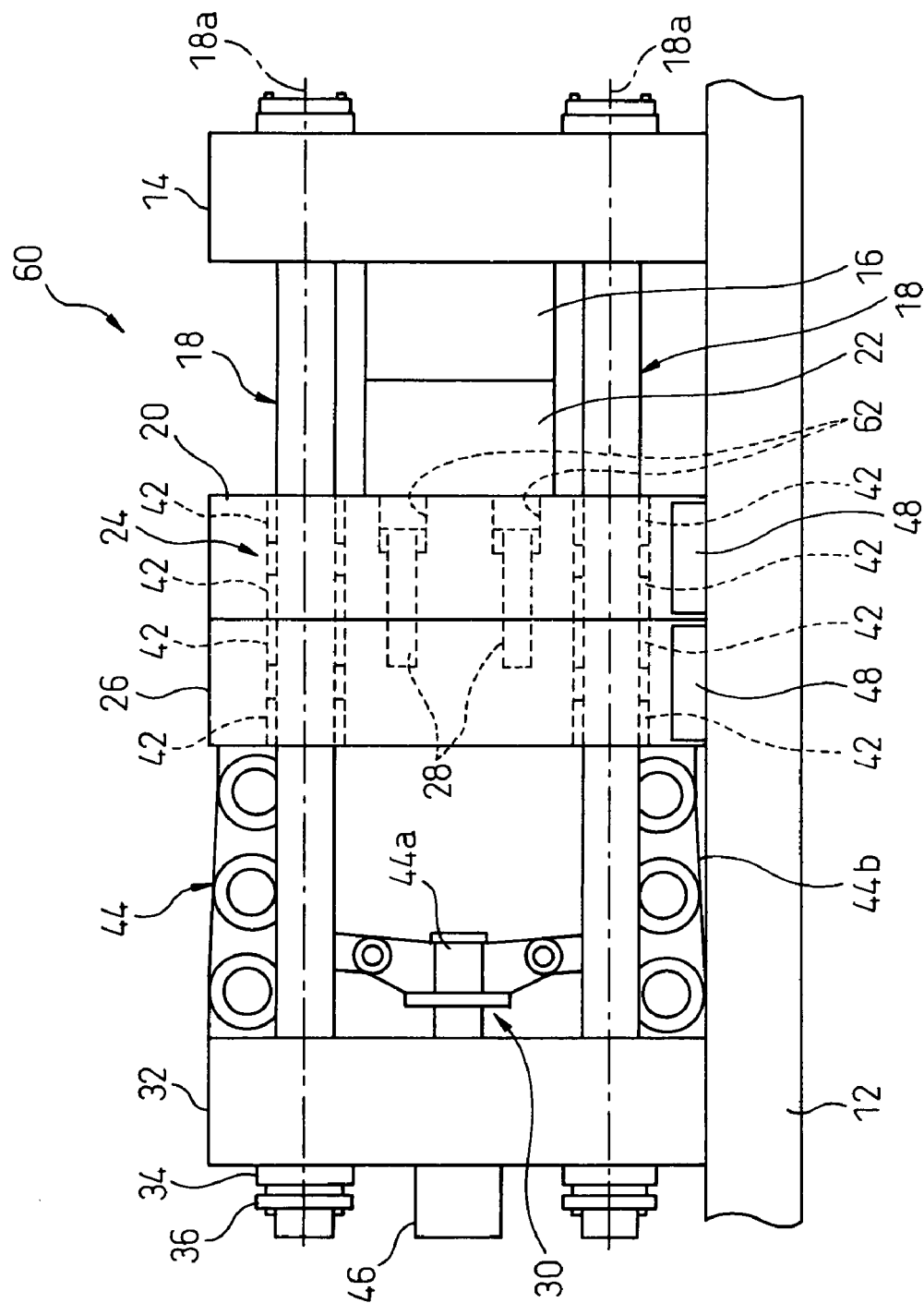
FIG. 6 is a schematic front view showing the clamping mechanism according to the third embodiment of the present invention.

The clamping mechanism 60 includes a stationary platen 14 mounted on a bed 12; a first movable platen 20 arranged movably relative to the stationary platen 14 along the guiding axis 18a of a guide bar 18; a support structure 24 having a sliding bearing structure and movably supporting the first movable platen 20 on the guide bar 18 along the guiding axis 18a; a second movable platen 26 separate from the first movable platen 20, and arranged movably relative to the stationary platen 14 along the guiding axis 18a; and a connecting member 28 connecting the first movable platen 20 and the second movable platen 26 to each other in a manner shiftable along the guiding axis 18a relative to each other (FIG. 6).

As shown in FIG. 6, the guide bar 18, in the clamping mechanism 60, is structured as a tie bar 18 tying the stationary platen 14 and the end frame 32 to each other. In the illustrated embodiment, the mutually opposing surfaces of the stationary platen 14 and of the end frame 32 are of rectangular profiles, and four tie bars 18 are arranged respectively at the four corners of the opposing surfaces. Each tie bar 18 is received, in a relatively movable manner, in through-holes formed in both the first movable platen 20 and the second movable platen 26 in such a manner as to be aligned with each other along the guiding axis 18a. Each tie bar 18 is a rod member having a substantially smooth outer-circumferential surface. Each through-hole in the first and second movable platens 20, 26 for receiving the tie bar 18 is provided with a sliding bearing bush 42. Each sliding bearing bush 42 slidably receives the corresponding tie bar 18 through a slight clearance therebetween, whereby the first and second movable platens 20, 26 are guided along the guiding axis 18a. Thus, in the clamping mechanism 60, the first and second movable platens 20, 26 are engaged with the tie bars 18 through the support structure 24 having the sliding bearing structure, and are moved along the guiding axis 18a by the driving operation of a drive section 30.

Figure 5A:
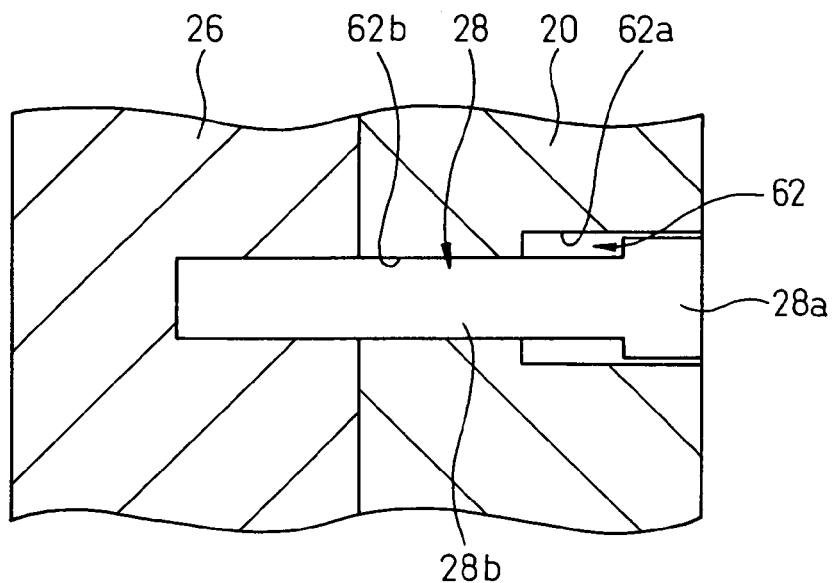
FIGS. 5A and 5B are schematic views respectively showing a connecting member in a clamping mechanism according to a third embodiment the present invention.
Figure 5B:
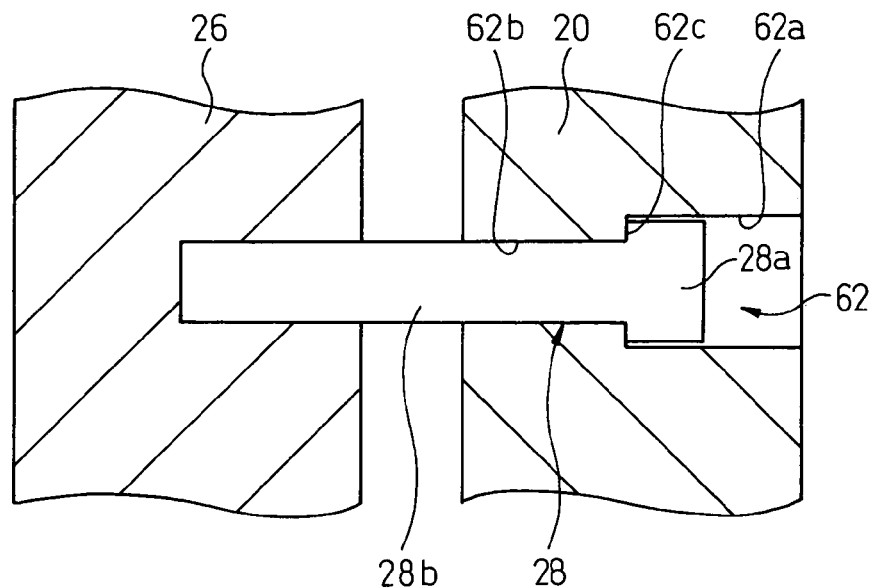

As shown in FIGS. 5A and 5B, the connecting member 28 is formed from a fastening element having a bulging head 28a and a stem 28b, such as a bolt, and locally connects the first movable platen 20 to the second movable platen 26 in a mutually shiftable manner at the position of the connecting member 28. In the illustrated embodiment, two connecting members 28 are provided at locations in proximity with the centers of the respective movable platens 20, 26 (FIG. 6).

Each connecting member 28 is secured at one end length of the stem 28b to the second movable platen 26, and is attached at the other end length, including the head 28a, to the first movable platen 20 in a manner displaceable along the guiding axis 18a (FIG. 6). To ensure this relative displacement (i.e., "a play"), the first movable platen 20 is provided with stepped through-holes 62, each receiving the head 28a and the stem 28b of the connecting member 28 in an axially movable manner and formed in parallel with the guiding axis 18a of the tie bar 18. Each stepped through-hole 62 includes a larger-diameter hole portion 62a for receiving the head 28a of the connecting member 28, and a smaller-diameter hole portion 62b for receiving the stem 28b of the connecting member 28. The larger-diameter hole portion 62a of the stepped through-hole 62 has an axial length depending on the required distance of the relative displacement of the first and second movable platens 20, 26. It is preferred that the larger-diameter hole portion 62a has a diameter permitting the head 28a of the connecting member 28 to be received therein with a sufficient gap defined therebetween. Also, it is preferred that the smaller-diameter hole portion 62d has a diameter permitting the stem 28b of the connecting member 28 to be received therein with a slight gap defined therebetween. Of course, the smaller-diameter hole portion 62d may receive the stem 28b in a slidable manner.

Figure 7:
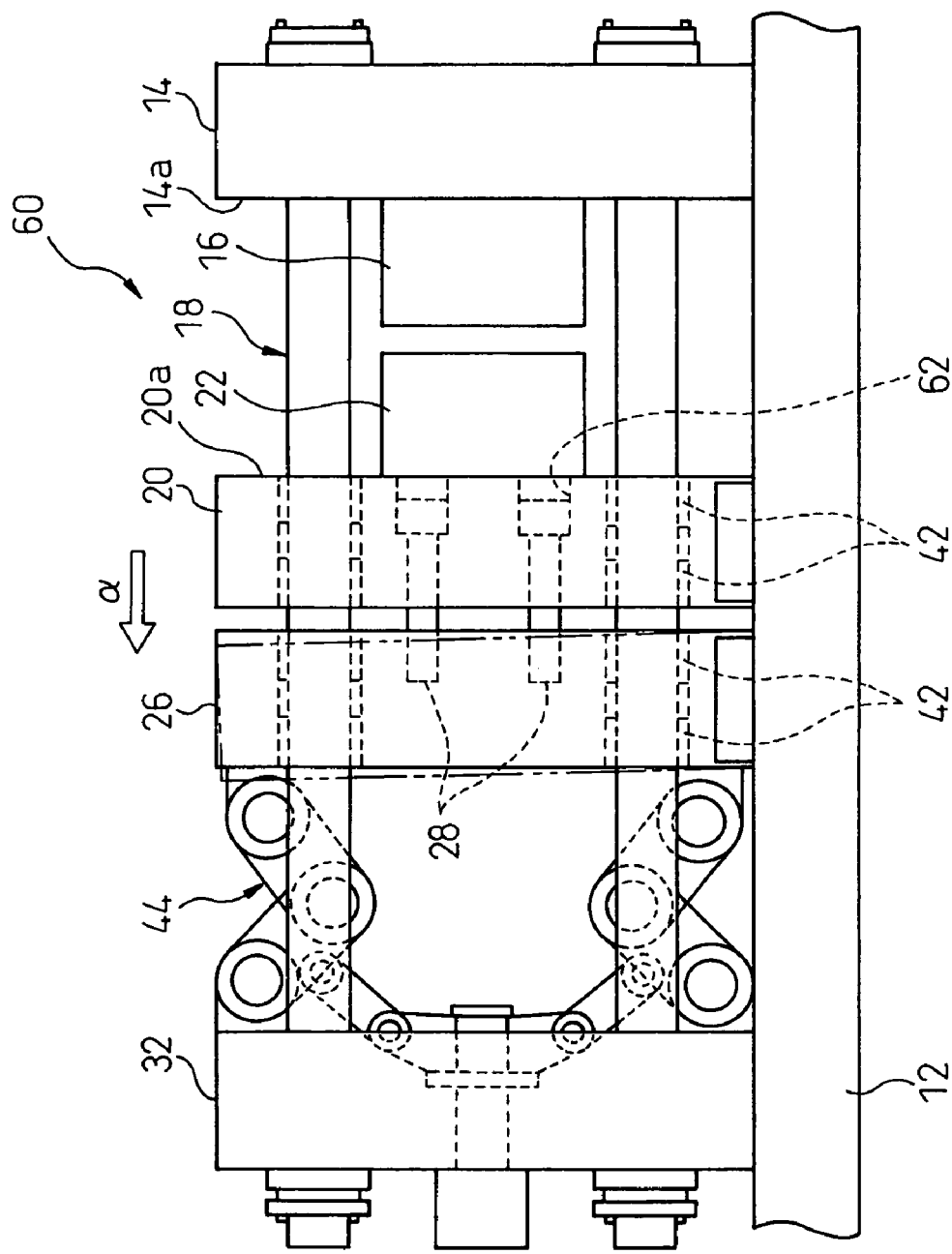
FIG. 7 is a schematic front view showing the clamping mechanism of FIG. 6 in a mold opening state.

FIG. 5A illustrates a state where the second movable platen 26 is in close contact with the first movable platen 20 (corresponding to the mold clamping state shown in FIG. 6), and FIG. 5B illustrates a state where the second movable platen 26 is parted from the first movable platen 20 (corresponding to the mold opening state shown in FIG. 7). In the state of FIG. 5B, the head 28a of the connecting member 28 is abutted to a shoulder face 62c located at a boundary between the larger-diameter hole portion 62a and the smaller-diameter hole portion 62b of the stepped through-hole 62 in the first movable platen 20, so that the second movable platen 26 and the first movable platen 20 cannot be spaced by more than a predetermined mutual shifting distance.

Referring to FIG. 7, when the toggle unit 44 is driven to move the second movable platen 26 and the first movable platen 20 in a mold-opening direction (shown by an arrow α), the second movable platen 26 first starts moving toward the end frame 32. In this connection, the first movable platen 20 is connected to the second movable platen 26 through the "play" obtained by the connecting members 28, and thereby remains stationary until the second movable platen 26 has been moved by the distance corresponding to the "play". When the second movable platen 26 moves by the distance exceeding the "play", the first movable platen 20 then starts moving toward the end frame 32 while being pulled by the connecting members 28, and thus the molds 16, 22 are opened.

Therefore, in the case where the second movable platen 26, linked to the toggle unit 44, is strained or deformed due to, e.g., the weight of the toggle unit 44 during the mold opening state where the stationary mold 16 is not in contact with the movable mold 22, as shown by a broken line in FIG. 7, the "play" between the respective connecting members 28 and the stepped through-holes 62 acts to absorb such a strain in the second movable platen 26. As a result, the first movable platen 20 is able to move in translation or parallel displacement, without being affected by the strain in the second movable platen 26, so that the parallelism between the mold attaching surfaces 14a, 20a of the stationary platen 14 and the first movable platen 20, as well as the parallelism between the stationary mold 16 and the movable mold 22 are maintained.

The correlation between the first and second movable platens 20, 26 and the connecting members 28 may be reversed from that in the illustrated embodiment. In other words, each connecting member may be constructed as to be secured at one end length of the stem 28b to the first movable platen 20, and is mutually displaceably received at the other end length, including the head 28a, in a stepped through-hole (not shown) formed in the second movable platen 26 so as to be attached to the second movable platen 26 in a manner displaceable along the guiding axis 18a.

Figure 8:
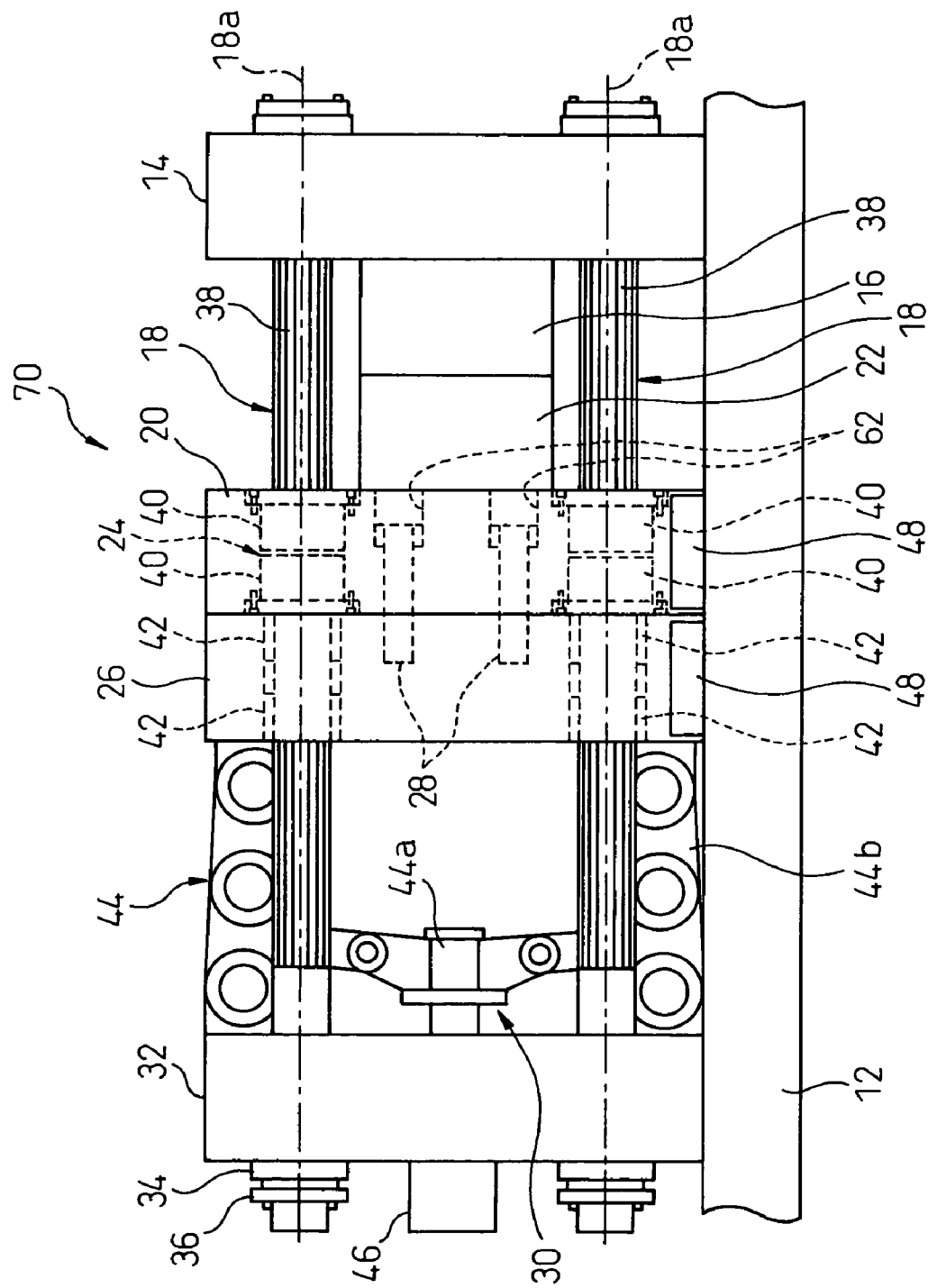
FIG. 8 is a schematic front view showing a clamping mechanism according to a fourth embodiment of the present invention.
Figure 9:
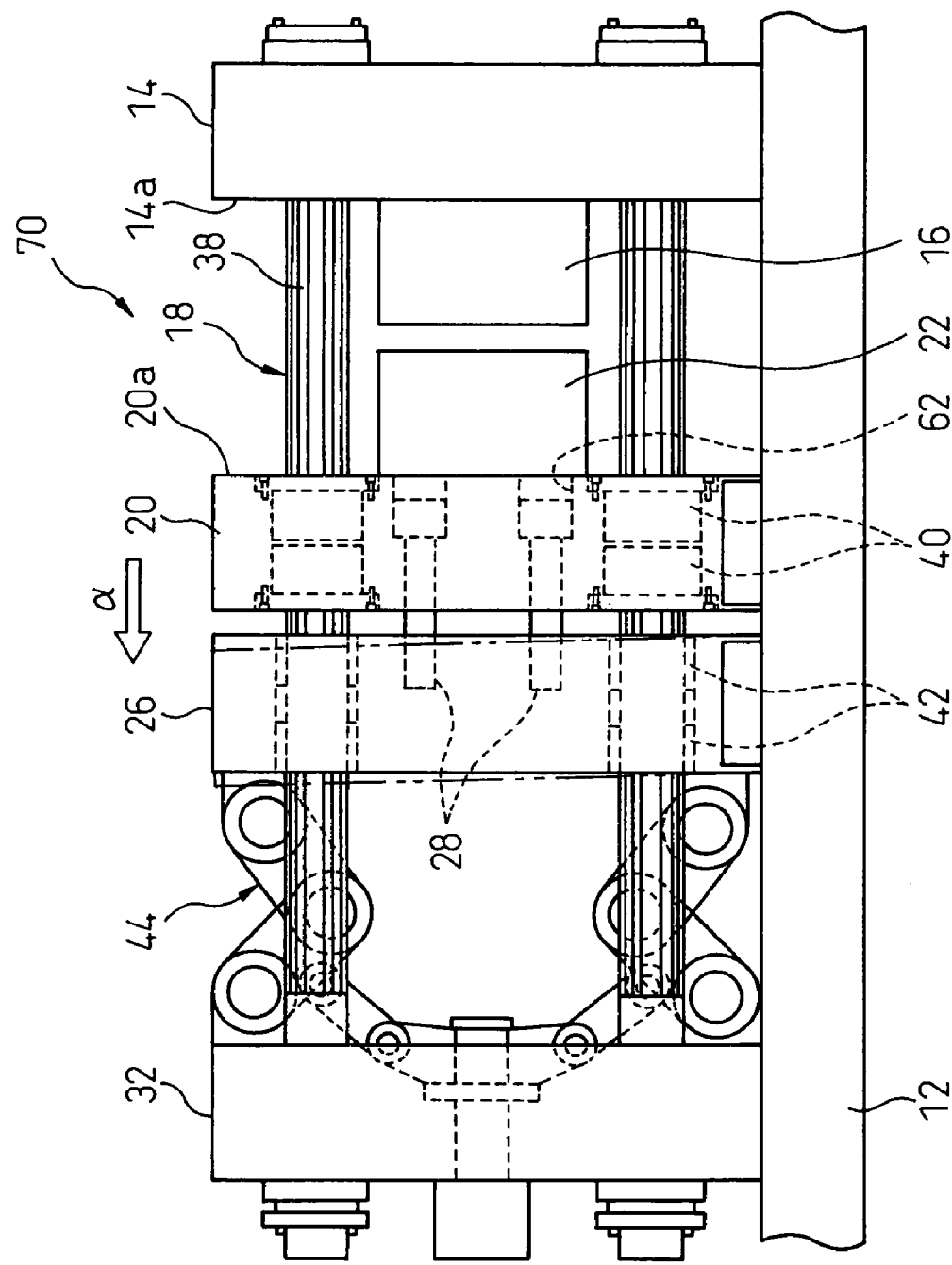
FIG. 9 is a schematic front view showing the clamping mechanism of FIG. 8 in a mold opening state.

FIGS. 8 and 9 show a clamping mechanism 70 according to a fourth embodiment realizing the second concept of the present invention, in mold clamping and opening states, respectively. The clamping mechanism 70 of the fourth embodiment has a configuration substantially identical to the clamping mechanism 60 of the third embodiment, except that the support structure supporting the first movable platen is formed from a ball spline structure. Therefore, corresponding components are denoted by common reference numerals and the detailed descriptions thereof are not repeated.

The clamping mechanism 70 includes a stationary platen 14 mounted on a bed 12; a first movable platen 20 arranged movably relative to the stationary platen 14 along the guiding axis 18a of a guide bar 18; a support structure 24 having a ball spline structure and movably supporting the first movable platen 20 on the guide bar 18 along the guiding axis 18a; a second movable platen 26 separate from the first movable platen 20, and arranged movably relative to the stationary platen 14 along the guiding axis 18a; and a connecting member 28 connecting the first movable platen 20 and the second movable platen 26 to each other in a manner shiftable along the guiding axis 18a relative to each other.

The support structure 24 having the ball spline structure in the clamping mechanism 70 is substantially the same as the support structure 24 in the first embodiment (FIG. 1). Thus, the guide bar 18 is structured as a tie bar 18 tying the stationary platen 14 and the end frame 32 to each other, and each of four tie bars 18 is provided with a spline engaging surface 38 at least over a predetermined surface area over which the first movable platen 20 slides along the tie bar 18. On the other hand, each through-hole in the first movable platen 20 for receiving the tie bar 18 is provided with a ball spline nut 40 operatively engagable with the spline engaging surface 38 of the tie bar 18. In contrast, each through-hole in the second movable platen 26 for receiving the tie bar 18 is provided with a sliding bearing bush 42 which is not engagable with the spline engaging surface 38 on the tie bar 18.

The connecting member 28 is the same as the connecting member 28 in the third embodiment, and two connecting members 28 are provided at locations in proximity with the centers of the respective movable platens 20, 26. Each connecting member 28 is secured at one end length of a stem 28b (FIG. 5A) to the second movable platen 26, and is received at the other end length, including a head 28a (FIG. 5A), in a stepped through-hole 62 of the first movable platen 20 so as to be attached to the first movable platen 20 in a manner displaceable along the guiding axis 18a (FIG. 8).

Referring to FIG. 9, when the toggle unit 44 is driven to move the second movable platen 26 and the first movable platen 20 in a mold-opening direction (shown by an arrow α), the second movable platen 26 first starts moving toward the end frame 32 along the tie bars 18 under the support of the sliding bearing structure. In this connection, the first movable platen 20 is connected to the second movable platen 26 through the "play" obtained by the connecting members 28, and thereby remains stationary until the second movable platen 26 has been moved by the distance corresponding to the "play". When the second movable platen 26 moves by the distance exceeding the "play", the first movable platen 20 then starts moving toward the end frame 32 along the tie bars 18 under the support of the support structure 24 having the ball spline structure, while being pulled by the connecting members 28, and thus the molds 16, 22 are opened.

It will be appreciated that the clamping mechanism 70 having the above configuration possesses characteristic effects substantially identical to those of the clamping mechanism 60 of the third embodiment. Further, in the clamping mechanism 70, the ball spline structure is adopted to the support structure 24 for the first movable platen 20, so that it is possible to maintain the parallelism between the mold attaching surfaces 14a, 20a of the stationary platen 14 and the first movable platen 20, as well as the parallelism between the stationary mold 16 and the movable mold 22. Moreover, the connecting member 28 serves to permit the first movable platen 20 to move in translation free of the strain in the second movable platen 26, so that it is possible to significantly increase the life of the ball spline structure.

Figure 10:
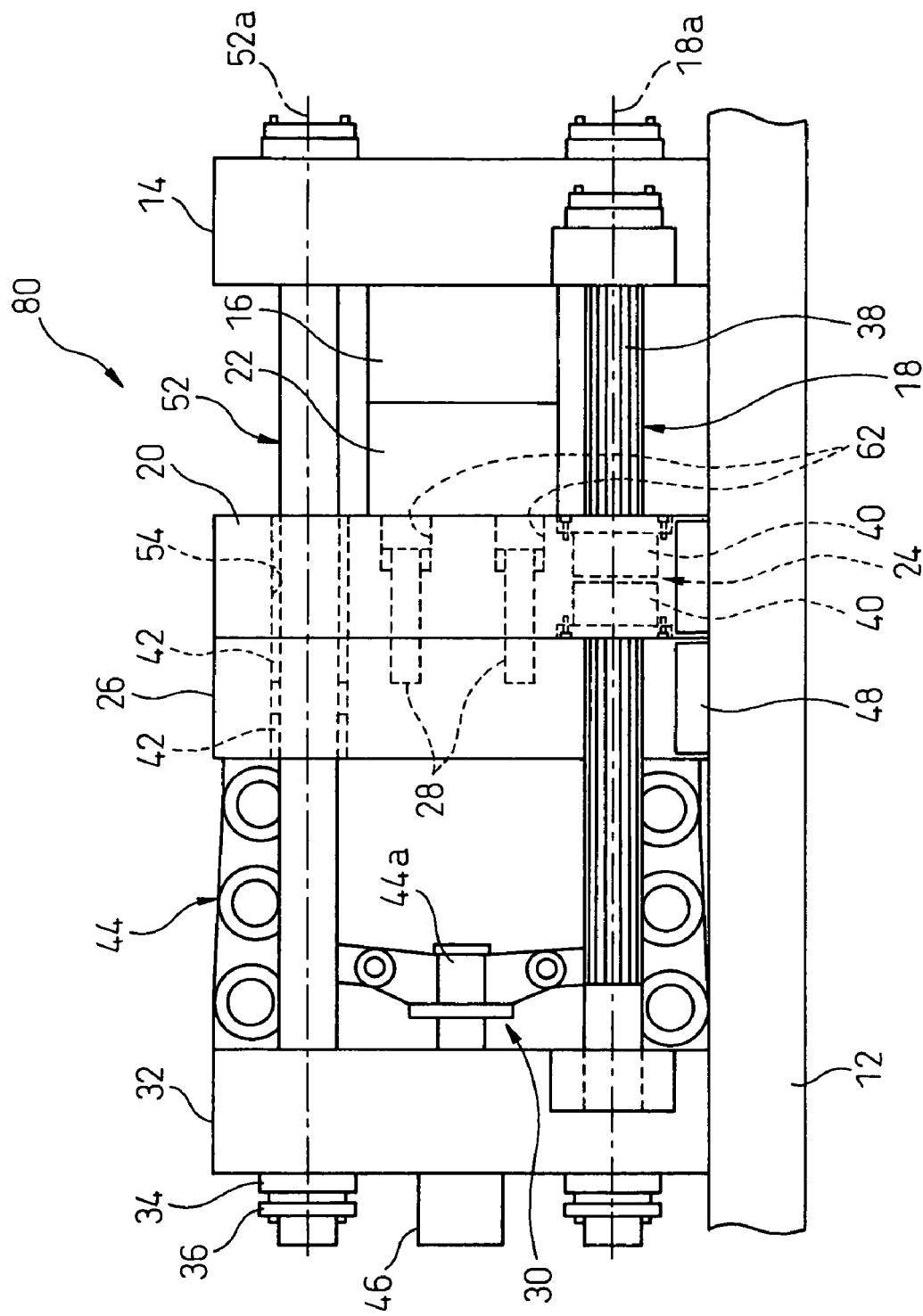
FIG. 10 is a schematic front view showing a clamping mechanism according to a fifth embodiment of the present invention.
Figure 11:
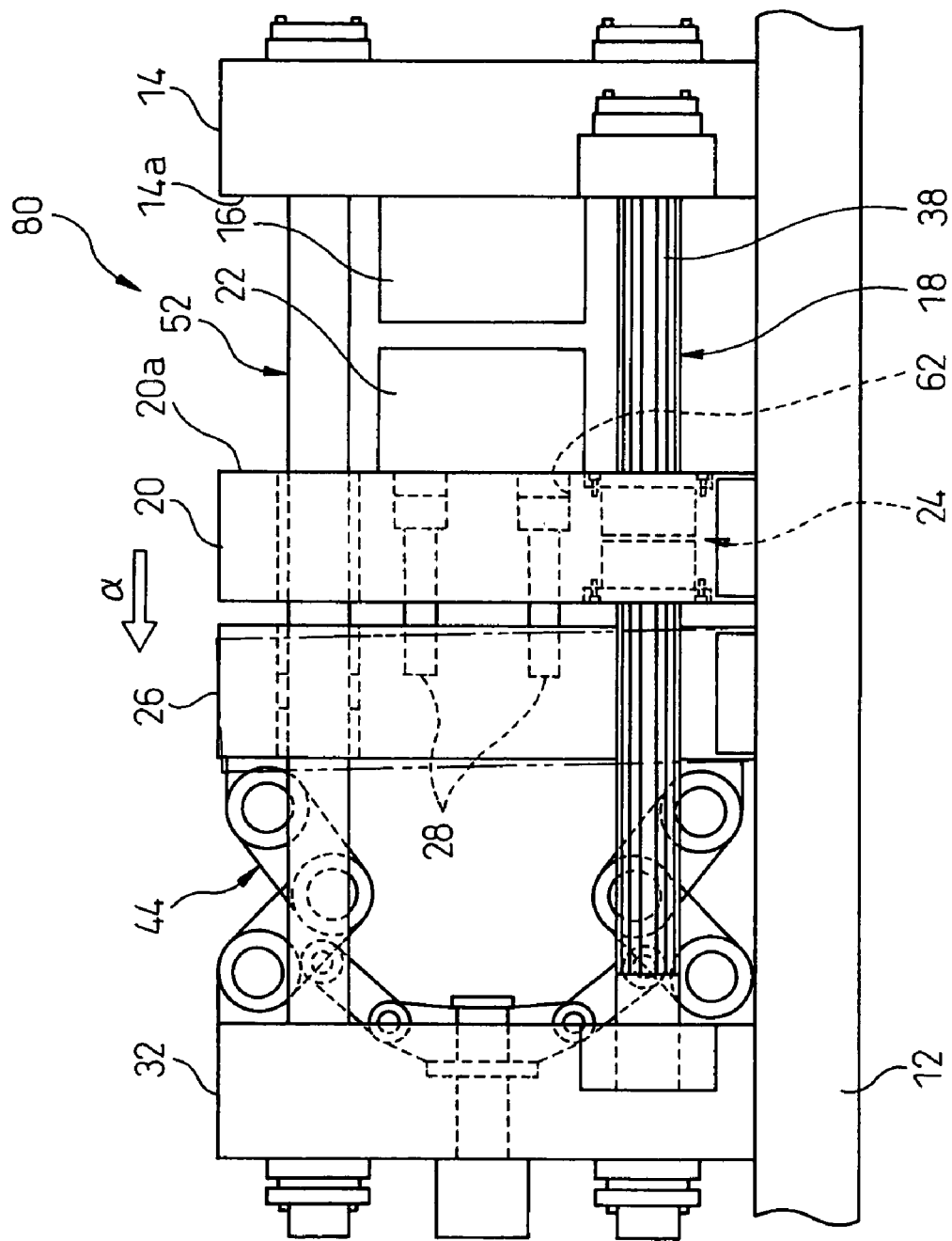
FIG. 11 is a schematic front view showing the clamping mechanism of FIG. 10 in a mold opening state.

FIGS. 10 and 11 show a clamping mechanism 80 according to a fifth embodiment realizing the second concept of the present invention, in mold clamping and opening states, respectively. The clamping mechanism 80 of the fifth embodiment has a configuration substantially identical to the clamping mechanism 70 of the fourth embodiment, except for the provision of a tie bar separate from the guide bar. Therefore, corresponding components are denoted by common reference numerals and the detailed descriptions thereof are not repeated.

The clamping mechanism 80 includes a guide bar 18 arranged fixedly relative to a stationary platen 14; a support structure 24 having a ball spline structure and movably supporting a first movable platen 20 on the guide bar 18 along the guiding axis 18a thereof; a tie bar 52, separate from the guide bar 18, defining a second longitudinal guiding axis 52a generally parallel to the guiding axis 18a and tying the stationary platen 14 and an end frame 32 to each other; and a connecting member 28 connecting the first movable platen 20 and the second movable platen 26 to each other in a manner shiftable along the guiding axis 18a relative to each other.

The support structure 24 having the ball spline structure in the clamping mechanism 80 is substantially the same as the support structure 24 in the second embodiment (FIG. 3). Thus, each of two guide bars 18 disposed along a diagonal line is provided with a spline engaging surface 38 at least over a predetermined surface area over which the first movable platen 20 slides along the guide bar 18. On the other hand, each through-hole in the first movable platen 20 for receiving the guide bar 18 is provided with a ball spline nut 40 operatively engagable with the spline engaging surface 38 of the guide bar 18. Each of four tie bars 52 is a rod member having a substantially smooth outer-circumferential surface, and each through-hole in the second movable platen 26 for receiving the tie bar 52 is provided with a sliding bearing bush 42.

The connecting member 28 is the same as the connecting member 28 in the fourth embodiment, and two connecting members 28 are provided at locations in proximity with the centers of the respective movable platens 20, 26. Each connecting member 28 is secured at one end length of a stem 28b (FIG. 5A) to the second movable platen 26, and is received at the other end length, including a head 28a (FIG. 5A), in a stepped through-hole 62 of the first movable platen 20 so as to be attached to the first movable platen 20 in a manner displaceable along the guiding axis 18a (FIG. 10).

It will be appreciated that the clamping mechanism 80 having the above configuration possesses characteristic effects substantially identical to those of the clamping mechanism 70 of the fourth embodiment. Further, in the clamping mechanism 80, the guide bar 18 is separate from the tie bar 52, so that it is possible to prevent the strain or deformation in the tie bars 52 from being transferred to the first movable platen 20, and thus improve the effect of inhibiting the tilt or rotation of the first movable platen 20, which further stabilizes the translation or parallel displacement of the first movable platen 20. Moreover, it is possible to further increase the life of the ball spline structure.

FIGS. 12A to 14 show a clamping mechanism 90 according to a sixth embodiment realizing the second concept of the present invention. The clamping mechanism 90 of the sixth embodiment has a configuration substantially identical to the clamping mechanism 70 of the fourth embodiment, except for the provision of a biasing member elastically biasing the first and second movable platens in a direction away from each other. Therefore, corresponding components are denoted by common reference numerals and the detailed descriptions thereof are not repeated.

The clamping mechanism 90 includes a stationary platen 14 mounted on a bed 12; a first movable platen 20 arranged movably relative to the stationary platen 14 along the guiding axis 18a of a guide bar 18; a support structure 24 having a ball spline structure and movably supporting the first movable platen 20 on the guide bar 18 along the guiding axis 18a; a second movable platen 26 separate from the first movable platen 20, and arranged movably relative to the stationary platen 14 along the guiding axis 18a; a connecting member 28 connecting the first movable platen 20 and the second movable platen 26 to each other in a manner shiftable along the guiding axis 18a relative to each other; and a biasing member 92 interposed between the first movable platen 20 and the second movable platen 26 and elastically biasing the first and second movable platens 20, 26 away from each other along the guiding axis 18a (FIG. 13).

Figure 12A:
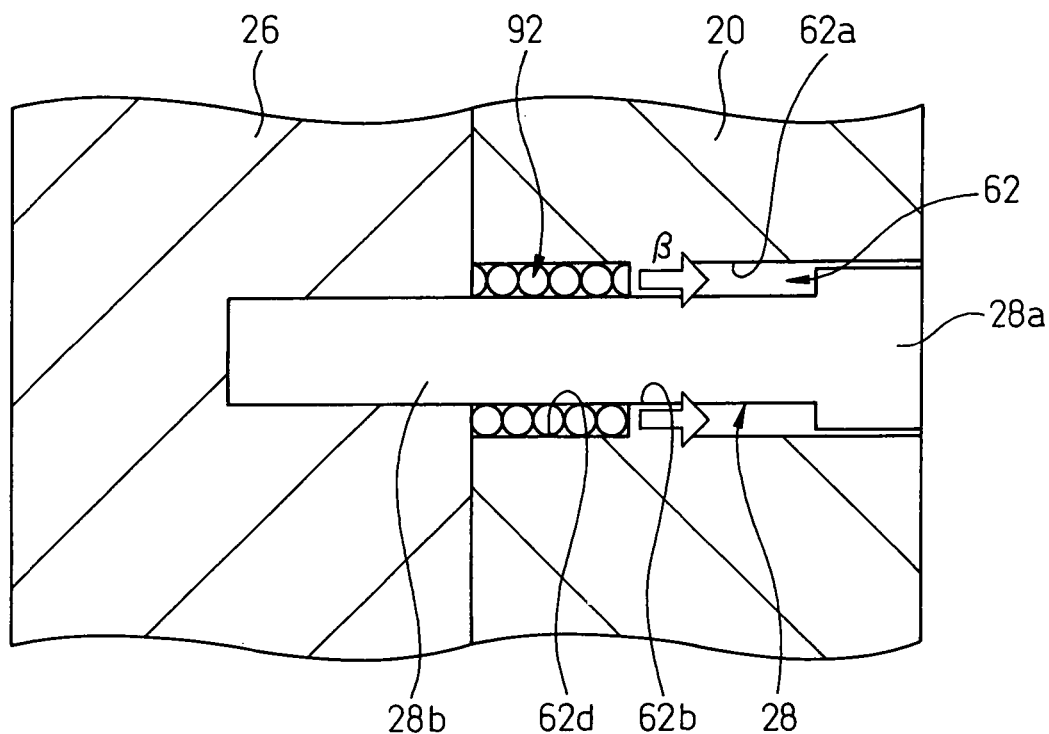
FIGS. 12A and 12B are schematic views respectively showing a connecting member and a biasing member in a clamping mechanism according to a sixth embodiment the present invention.
Figure 12B:
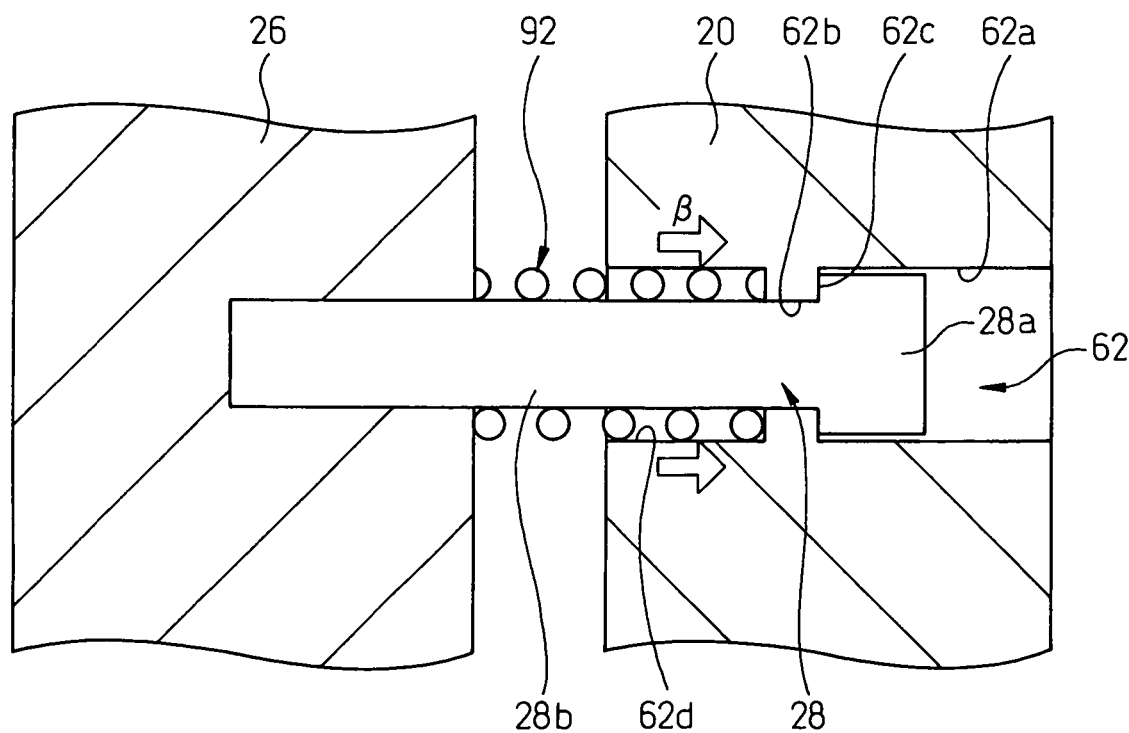

As shown in FIGS. 12A and 12B, the biasing member 92 is formed from an elastic element such as a compression coil spring, and elastically biases the first and second movable platen 20, 26 away from each other at the position of the connecting member 28. In the illustrated embodiment, two biasing members 92 formed from compression coil springs are respectively provided to the two connecting members 28 provided at locations in proximity with the centers of the movable platens 20, 26 (FIG. 13).

Each biasing member 92 is abutted at one end thereof to the surface of the second movable platen 26 facing the first movable platen 20, and is received at the other end length in a receptacle hole portion 62d of a stepped through-hole 62 in the first movable platen 20, which is recessed from the opening of the through-hole 62 facing the second movable platen 26 so as to enclose the stem 28b of the connecting member 28, so that the biasing member 92 is arranged to surround the stem 28b of the connecting member 28. Consequently, the biasing members 92 bias the first movable platen 20 relative to the second movable platen 26 in the direction toward the stationary platen 14 (shown by an arrow β).

In a state where the second movable platen 26 is in close contact with the first movable platen 20 as shown in FIG. 12A (corresponding to the mold clamping state shown in FIG. 13), the biasing member 92 is compressed in the receptacle hole portion 62d of the stepped through-hole 62, so as to bias the first movable platen 20 in the arrowed direction β. From this state, when the first and second movable platens 20, 26 move toward the end frame 32, the first and second movable platens 20, 26 are shifted into a mutually parted state by the function of the connecting member 28 as already described (FIG. 12B). In this state (corresponding to the mold opening state shown in FIG. 14), the head 28a of the connecting member 28 is abutted to a shoulder face 62c of the stepped through-hole 62 so as to anchor the second movable platen 26 and the first movable platen 20 at a predetermined correlative position, and therefore, the biasing member 92 is also compressed in the receptacle hole portion 62d of the stepped through-hole 62 to bias the first movable platen 20 in the arrowed direction β.

Referring to FIG. 14, when the toggle unit 44 is driven to move the second movable platen 26 and the first movable platen 20 in a mold-opening direction (shown by an arrow α), the second movable platen 26 first starts moving toward the end frame 32 along the tie bars 18 under the support of the sliding bearing structure. In this connection, the first movable platen 20 is connected to the second movable platen 26 through the "play" obtained by the connecting members 28, and thereby remains stationary until the second movable platen 26 has been moved by the distance corresponding to the "play". When the second movable platen 26 moves by the distance exceeding the "play", the first movable platen 20 then starts moving toward the end frame 32 along the tie bars 18 under the support of the support structure 24 having the ball spline structure, while being pulled by the connecting members 28, and thus the molds 16, 22 are opened.

In this regard, during a period from an instant when the second movable platen 26 starts moving to an instant when the first movable platen 20 starts moving, the biasing members 92 continue to elastically bias the first movable paten 20 toward the stationary platen 14. Also, during a period when the first movable platen 20 moves together with the second movable platen 26 through the connecting members 28, the biasing members 92 continue to elastically bias the first movable paten 20 toward the stationary platen 14. Consequently, it is possible to effectively suppress an unintentional unstable travel of the first movable platen 20, by the elastic biasing force of the biasing members 92, which may otherwise be caused due to the mutual parting action of the first and second movable platens 20, 26.

It will be appreciated that the clamping mechanism 90 having the above configuration possesses characteristic effects substantially identical to those of the clamping mechanism 70 of the fourth embodiment. Further, in the clamping mechanism 90, the biasing members 92 serve to elastically bias the first and second movable platens 20, 26 in the direction away from each other, so that it is possible to surely prevent the unstable travel of the first movable platen 20. Accordingly, the first movable platen 20 is able to stably and smoothly move in translation or parallel displacement during the mold opening process, without being affected by the strain and/or tilting in the second movable platen 26, so that it is possible to maintain, highly accurately, the parallelism between the mold attaching surfaces 14a, 20a of the stationary platen 14 and the first movable platen 20, as well as the parallelism between the stationary mold 16 and the movable mold 22, and thus to increase the life of the ball spline structure.

It should be noted that the biasing member 92 as described may be adopted in the clamping mechanism 60 (FIG. 6) or the clamping mechanism 80 (FIG. 10). In this configuration, the unstable motion of the first movable platen 20 is also surely resolved. Further, a receptacle hole portion for receiving the biasing member 92 may be formed in the second movable platen 26.

FIGS. 15A to 17 show a clamping mechanism 100 according to a seventh embodiment realizing the second concept of the present invention. The clamping mechanism 100 of the seventh embodiment has a configuration substantially identical to the clamping mechanism 70 of the fourth embodiment, except for the provision of a biasing member elastically biasing the first and second movable platens in a direction toward each other. Therefore, corresponding components are denoted by common reference numerals and the detailed descriptions thereof are not repeated.

The clamping mechanism 100 includes a stationary platen 14 mounted on a bed 12; a first movable platen 20 arranged movably relative to the stationary platen 14 along the guiding axis 18a of a guide bar 18; a support structure 24 having a ball spline structure and movably supporting the first movable platen 20 on the guide bar 18 along the guiding axis 18a; a second movable platen 26 separate from the first movable platen 20, and arranged movably relative to the stationary platen 14 along the guiding axis 18a; a connecting member 28 connecting the first movable platen 20 and the second movable platen 26 to each other in a manner shiftable along the guiding axis 18a relative to each other; and a biasing member 102 interposed between the first movable platen 20 and the second movable platen 26 and elastically biasing the first and second movable platens 20, 26 toward each other along the guiding axis 18a (FIG. 16).

Figure 15A:
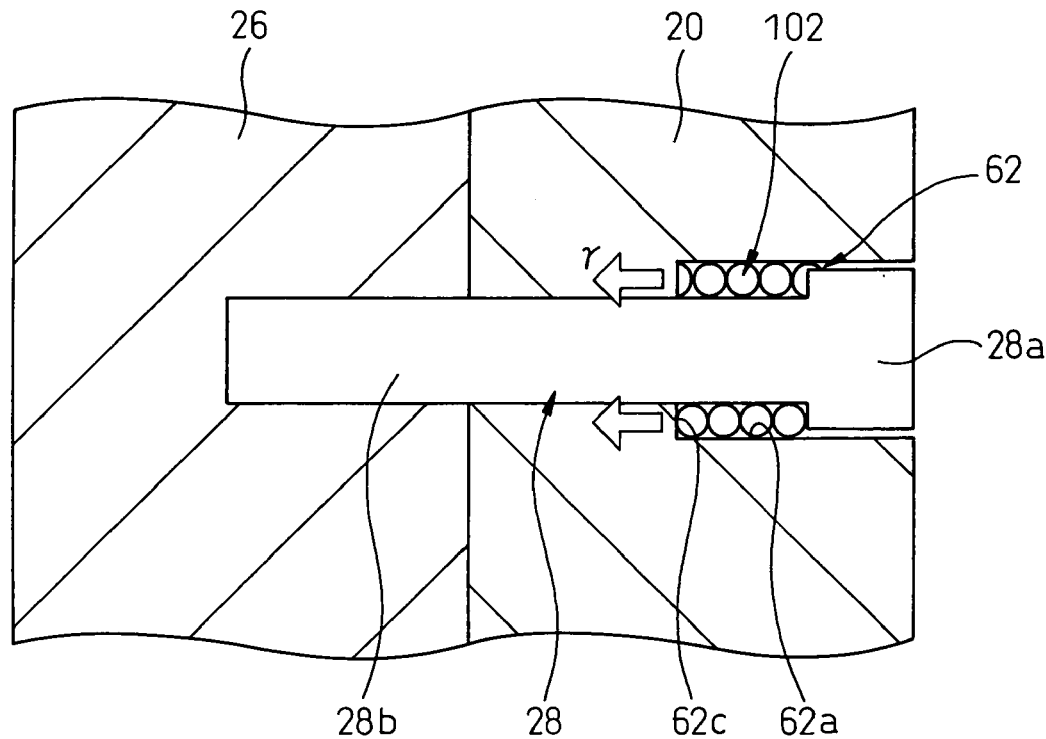
FIGS. 15A and 15B are schematic views respectively showing a connecting member and a biasing member in a clamping mechanism according to a seventh embodiment the present invention.
Figure 15B:
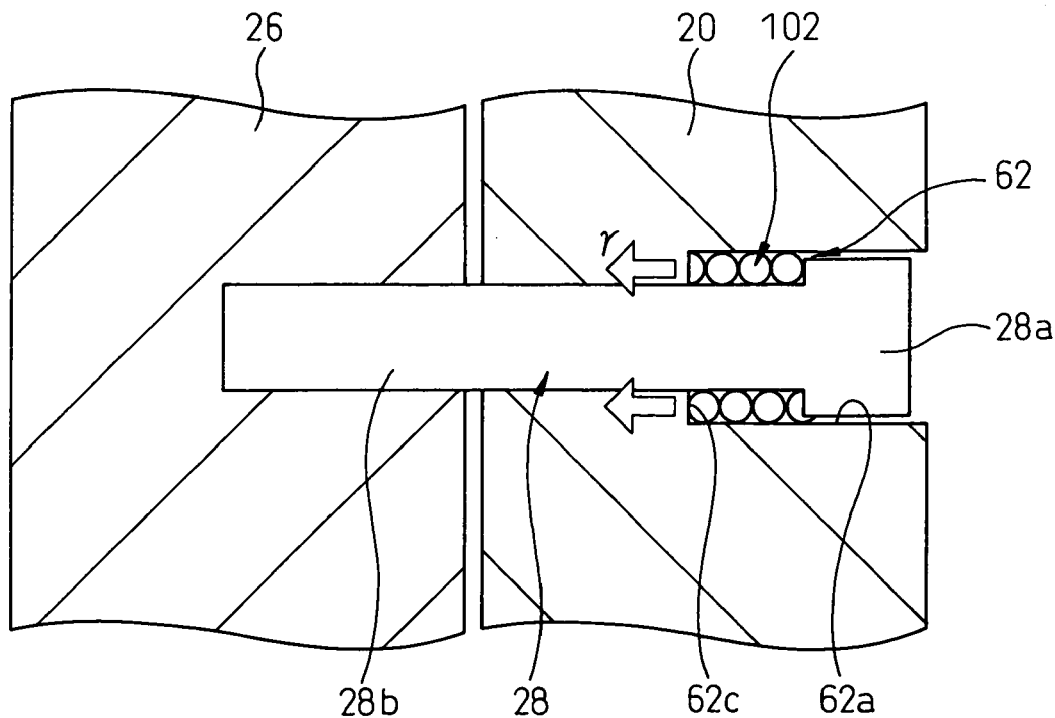

As shown in FIGS. 15A and 15B, the biasing member 102 is formed from an elastic element such as a compression coil spring, and elastically biases the first and second movable platen 20, 26 toward each other at the position of the connecting member 28. In the illustrated embodiment, two biasing members 102 formed from compression coil springs are respectively provided to the two connecting members 28 provided at locations in proximity with the centers of the movable platens 20, 26 (FIG. 16).

Each biasing member 102 is received in the larger-diameter hole portion 62a of a stepped through-hole 62 in the first movable platen 20, and is abutted at one end thereof to the shoulder face 62c of the stepped through-hole 62 and at the other end to the head 28a of the corresponding connecting member 28, so that the biasing member 102 is arranged to surround the stem 28b of the connecting member 28. Consequently, the biasing members 102 bias the first movable platen 20 relative to the second movable platen 26 in the direction toward the end frame 32 (shown by an arrow γ).

In a state where the second movable platen 26 is in close contact with the first movable platen 20 as shown in FIG. 15A (corresponding to the mold clamping state shown in FIG. 16), the biasing member 102 is compressed in the larger-diameter hole portion 62a of the stepped through-hole 62, so as to bias the first movable platen 20 in the arrowed direction γ. From this state, when the first and second movable platens 20, 26 move toward the end frame 32, the first and second movable platens 20, 26 are shifted into a mutually parted state by the function of the connecting member 28 as already described (FIG. 15B). In this state (corresponding to the mold opening state shown in FIG. 17), the biasing member 102 is also compressed in the larger-diameter hole portion 62a of the stepped through-hole 62 to bias the first movable platen 20 in the arrowed direction γ, and thus acts to reduce the space between the first and second movable platens 20, 26.

Figure 17:
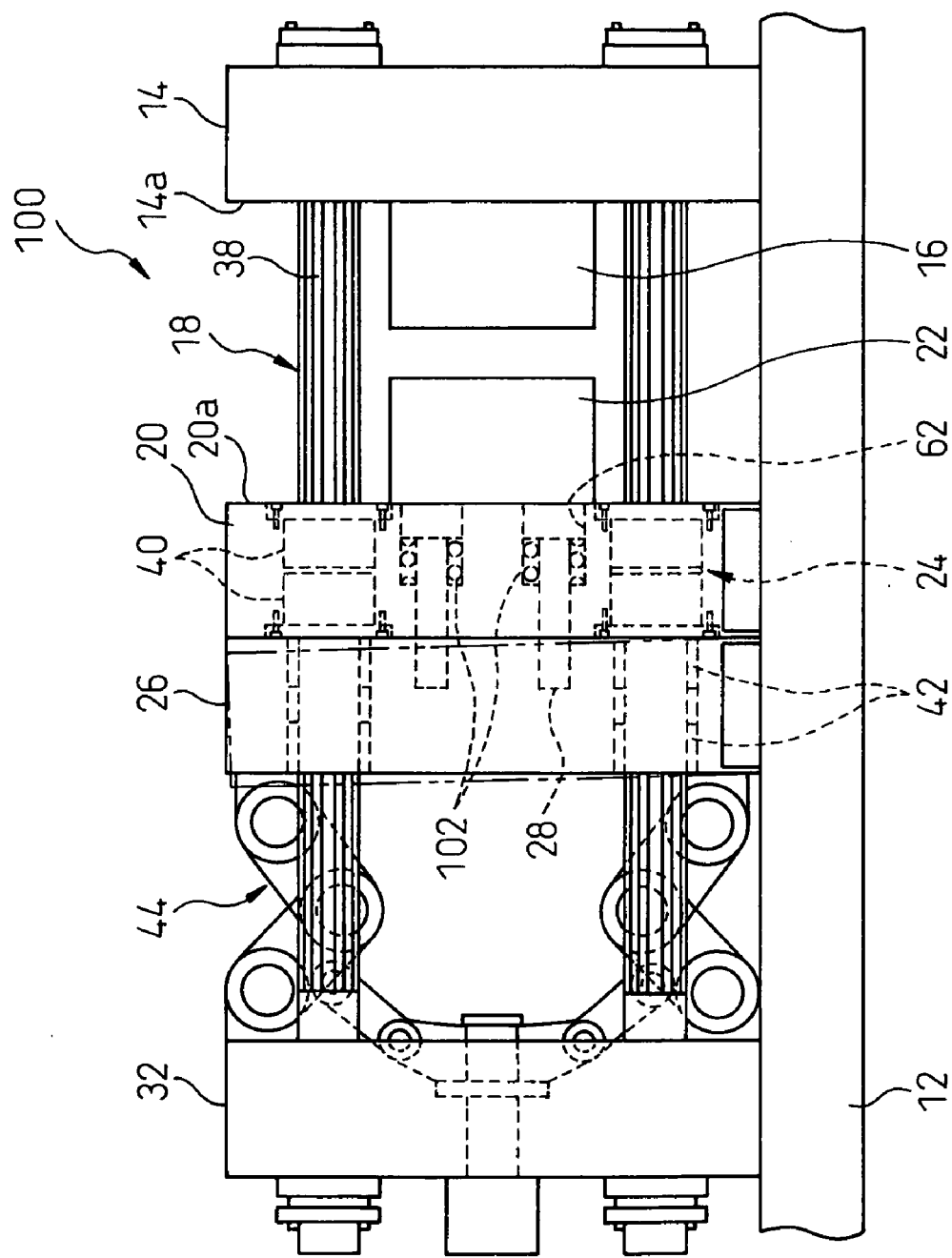
FIG. 17 is a schematic front view showing the clamping mechanism of FIG. 16 in a mold opening state.

Referring to FIG. 17, when the toggle unit 44 is driven to move the second movable platen 26 and the first movable platen 20 in a mold-opening direction (shown by an arrow α), the second movable platen 26 first starts moving toward the end frame 32 along the tie bars 18 under the support of the sliding bearing structure. In this connection, the first movable platen 20 is connected to the second movable platen 26 through the "play" obtained by the connecting members 28, but is biased toward the second movable platen 26 under the elastic biasing force of the biasing members 102. As a result, before the second movable platen 26 moves by the distance corresponding to the "play", the first movable platen 20 starts moving toward the end frame 32 along the tie bars 18 under the support of the support structure 24 having the ball spline structure, while being pulled by the connecting members 28, and thus the molds 16, 22 are opened.

Thus, during a period from an instant when the second movable platen 26 starts moving to an instant when the first movable platen 20 starts moving, as well as during a period when the first movable platen 20 moves together with the second movable platen 26 through the connecting members 28, the biasing members 102 continue to elastically bias the first movable paten 20 toward the second movable platen 26. Consequently, it is possible to effectively suppress an unintentional unstable travel of the first movable platen 20, by the elastic biasing force of the biasing members 102, which may otherwise be caused due to the mutual parting action of the first and second movable platens 20, 26.

It will be appreciated that the clamping mechanism 100 having the above configuration possesses characteristic effects substantially identical to those of the clamping mechanism 70 of the fourth embodiment. Further, in the clamping mechanism 100, the biasing members 102 serve to elastically bias the first and second movable platens 20, 26 in the direction toward each other, so that it is possible to surely resolve the unstable travel of the first movable platen 20. Besides, the biasing members 102 further serve to resolve minute backlash of the connecting members 28, which may otherwise generate due to a mutual contact between the head 28a of the connecting member 28 and the shoulder face 62c of the stepped through-hole 62. Accordingly, the first movable platen 20 is able to stably and smoothly move in translation or parallel displacement during the mold opening process, without being affected by the strain and/or tilting in the second movable platen 26, so that it is possible to maintain, highly accurately, the parallelism between the mold attaching surfaces 14a, 20a of the stationary platen 14 and the first movable platen 20 as well as the parallelism between the stationary mold 16 and the movable mold 22, and thus to increase the life of the ball spline structure.

It should be noted that the biasing member 102 as described may be adopted in the clamping mechanism 60 (FIG. 6) or the clamping mechanism 80 (FIG. 10). In this configuration, the unstable motion of the first movable platen 20 is also surely resolved.

Figure 18:
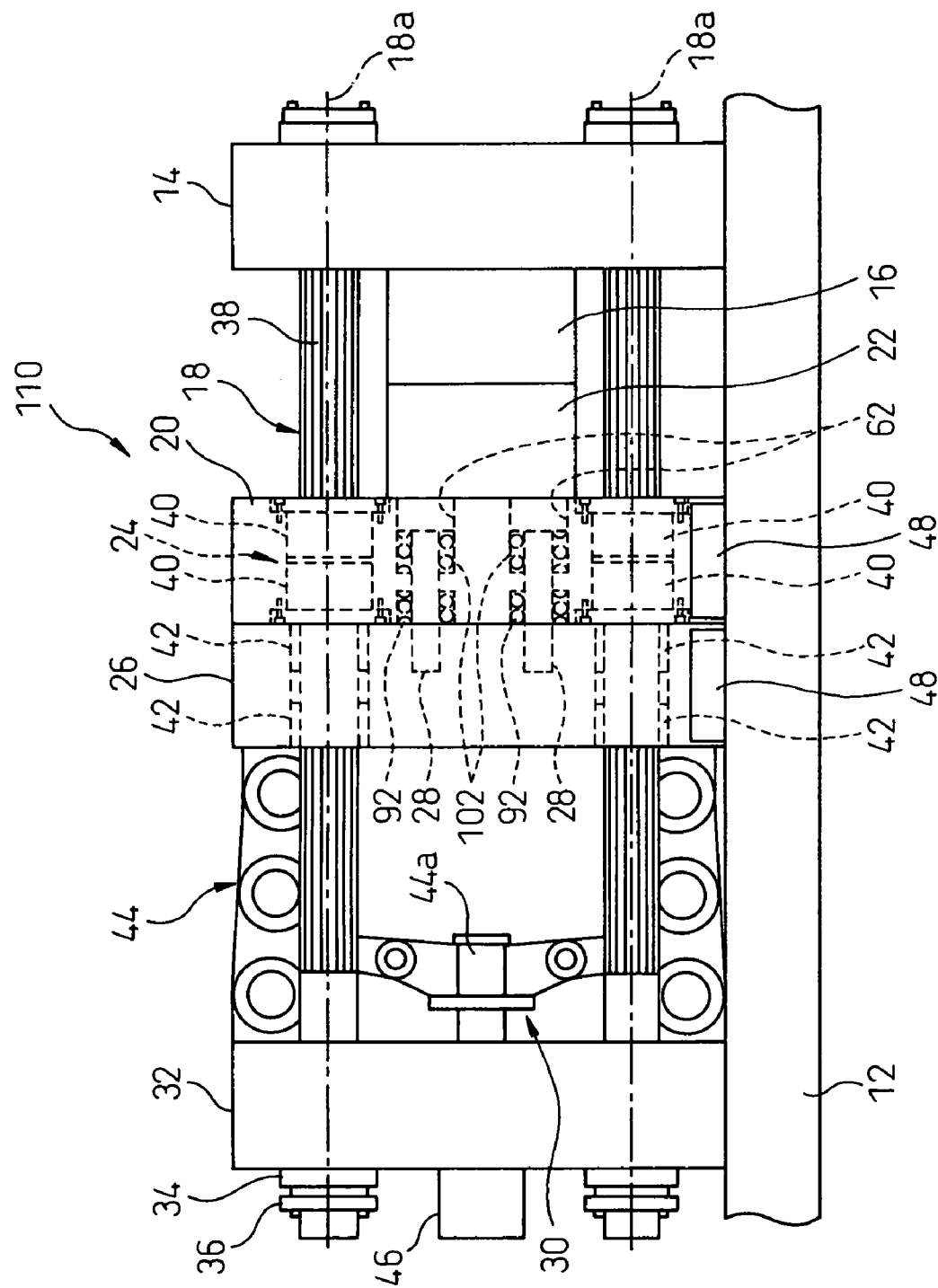
FIG. 18 is a schematic front view showing a clamping mechanism according to an eighth embodiment of the present invention.
Figure 19:
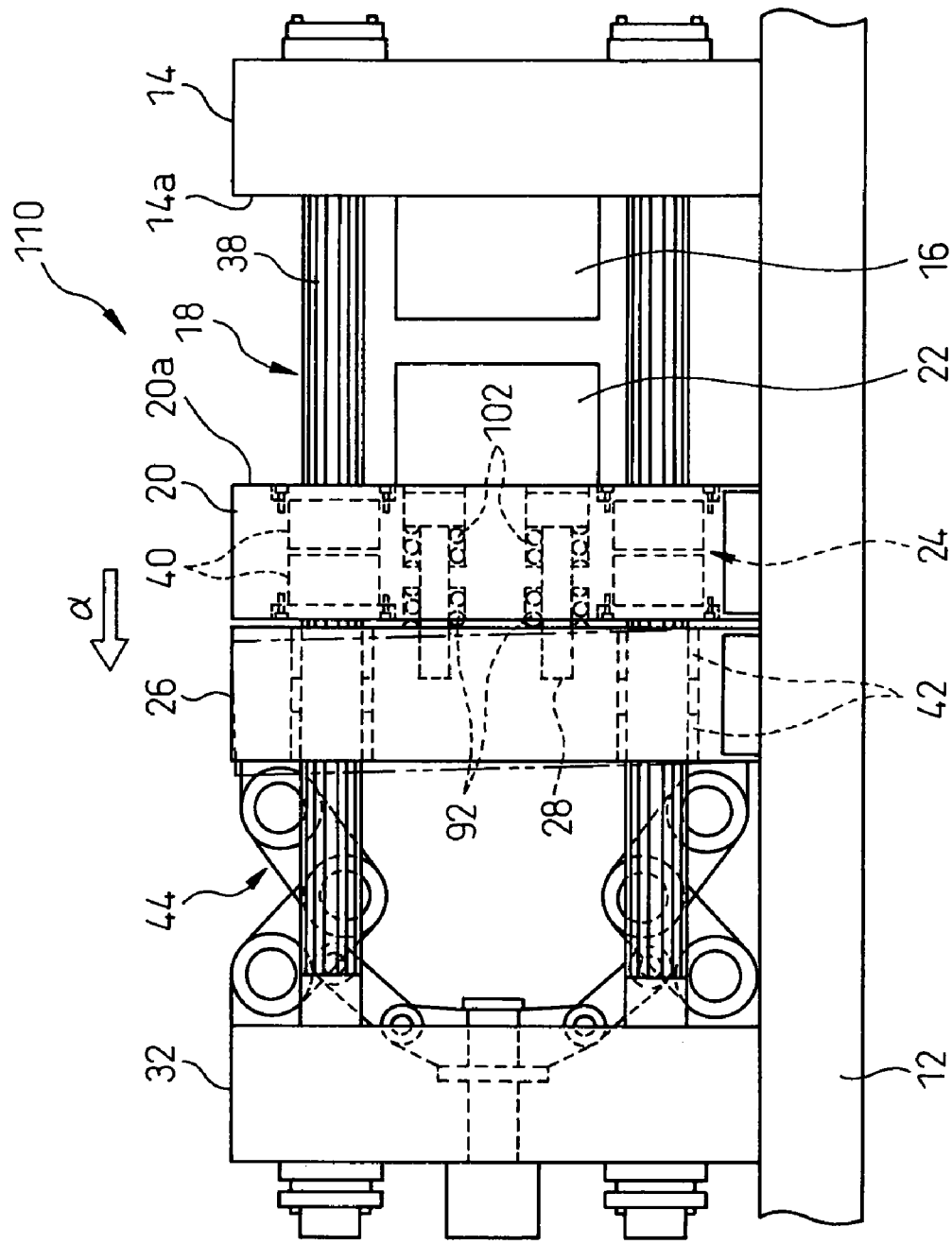
FIG. 19 is a schematic front view showing the clamping mechanism of FIG. 18 in a mold opening state.

FIGS. 18 and 19 show a clamping mechanism 110 according to an eighth embodiment realizing the second concept of the present invention. The clamping mechanism 110 of the eighth embodiment has a configuration substantially identical to each of the clamping mechanisms 90, 100 of the sixth and seventh embodiments, except for the provision of both biasing members 100, 102 provided respectively in the clamping mechanisms 90, 100. Therefore, corresponding components are denoted by common reference numerals and the detailed descriptions thereof are not repeated.

The clamping mechanism 110 includes a stationary platen 14 mounted on a bed 12; a first movable platen 20 arranged movably relative to the stationary platen 14 along the guiding axis 18a of a guide bar 18; a support structure 24 having a ball spline structure and movably supporting the first movable platen 20 on the guide bar 18 along the guiding axis 18a; a second movable platen 26 separate from the first movable platen 20, and arranged movably relative to the stationary platen 14 along the guiding axis 18a; a connecting member 28 connecting the first movable platen 20 and the second movable platen 26 to each other in a manner shiftable along the guiding axis 18a relative to each other; and biasing members 100, 102 interposed between the first movable platen 20 and the second movable platen 26 and elastically biasing the first and second movable platens 20, 26 away from and toward each other along the guiding axis 18a, respectively (i.e., in opposing directions).

Referring to FIG. 19, when the toggle unit 44 is driven to move the second movable platen 26 and the first movable platen 20 in a mold-opening direction (shown by an arrow α), the second movable platen 26 first starts moving toward the end frame 32 along the tie bars 18 under the support of the sliding bearing structure. In this connection, the first movable platen 20 is connected to the second movable platen 26 through the "play" obtained by the connecting members 28, but is in an elastically "floating" condition in relation to the second movable platen 26 under the opposing elastic biasing forces of the biasing members 92, 102. As a result, before the second movable platen 26 moves by the distance corresponding to the "play", the first movable platen 20 starts moving toward the end frame 32 along the tie bars 18 under the support of the support structure 24 having the ball spline structure, while being pulled by the connecting members 28, and thus the molds 16, 22 are opened.

Thus, during a period from an instant when the second movable platen 26 starts moving to an instant when the first movable platen 20 starts moving, as well as during a period when the first movable platen 20 moves together with the second movable platen 26 through the connecting members 28, the biasing members 92, 102 continue to elastically "float" the first movable paten 20 relative to the second movable platen 26. Consequently, it is possible to effectively suppress, by the elastic biasing force of the biasing members 92, 102, not only an unintentional unstable travel of the first movable platen 20, which may otherwise be caused due to the mutual parting action of the first and second movable platens 20, 26, but also an unintentional unstable travel of the first movable platen 20, which may otherwise be caused due to the mutual abutting action of the first and second movable platens 20, 26 during the translation motion.

It will be appreciated that the clamping mechanism 110 having the above configuration possesses characteristic effects substantially identical to those of the clamping mechanisms 90, 100 as described above, and also possesses both of the advantages of the clamping mechanisms 90, 100.

It should be noted that the elastic biasing force of the biasing members 92, 102 is required to be adjusted into smaller than the driving force of the drive section 30, so as not to affect the clamping operation of the molds 16, 22. Also, the biasing members 92, 102 may be formed from elastic elements other than the spring, such as rubbers.

While the invention has been described with reference to specific preferred embodiments, it will be understood by those skilled in the art that various changes and modifications may be made thereto without departing from the spirit and scope of the following claims.

The invention claimed is:

1. A clamping mechanism of a molding machine, comprising:
   a bed;
   a stationary platen mounted on said bed, and carrying a stationary mold;
   a guide bar arranged fixedly relative to said stationary platen, and defining a longitudinal guiding axis;
   a first movable platen arranged movably relative to said stationary platen along said guiding axis, and carrying a movable mold;
   a support structure interposed between said guide bar and said first movable platen, and movably supporting said first movable platen on said guide bar along said guiding axis;
   a second movable platen separate from said first movable platen and abutting said first movable platen at least when said clamping mechanism is in a mold-clamping state, and arranged movably relative to said stationary platen along said guiding axis;
   a connecting member connecting said first movable platen and said second movable platen to each other; and
   a drive section for applying a drive force to said second movable platen, to move said first movable platen and said second movable platen along said guiding axis.

2. A clamping mechanism, as set forth in claim 1, wherein said support structure comprises a spline engaging surface provided on said guide bar and a ball spline nut provided in said first movable platen, said ball spline nut being operatively engagable with said spline engaging surface.

3. A clamping mechanism, as set forth in claim 2, wherein said second movable platen includes a through-hole receiving said guide bar without engaging with said spline engaging surface.

4. A clamping mechanism, as set forth in claim 2, further comprising an end frame mounted on said bed at a location opposite to said stationary platen, said first and second movable platens being movably arranged between the stationary platen and the end frame; wherein said guide bar comprises a tie bar tying said stationary platen to said end frame.

5. A clamping mechanism, as set forth in claim 2, further comprising an end frame mounted on said bed at a location opposite to said stationary platen, said first and second movable platens being movably arranged between the stationary platen and the end frame, and a tie bar, separate from said guide bar, being attached to the end frame and defining a second longitudinal guiding axis generally parallel to said guiding axis of said guide bar; said tie bar tying said stationary platen to said end frame.

6. A clamping mechanism, as set forth in claim 5, wherein said first movable platen includes a first through-hole independent of said ball spline nut and extending along said second guiding axis; wherein said second movable platen includes a second through-hole aligned along said second guiding axis with said first through-hole; and wherein said tie bar is received in said first and second through-holes.

7. A clamping mechanism, as set forth in claim 1, wherein said connecting member connects said first and second movable platens in a manner shiftable along said guiding axis relative to each other.

8. A clamping mechanism, as set forth in claim 7, further comprising a biasing member interposed between said first and second movable platens, said biasing member elastically biasing said first and second movable platens away from each other along said guiding axis.

9. A clamping mechanism, as set forth in claim 7, further comprising a biasing member interposed between said first and second movable platens, said biasing member elastically biasing said first and second movable platens toward each other along said guiding axis.

10. A clamping mechanism, as set forth in claim 1, wherein said first movable platen is made from a material having a rigidity higher than that of said second movable platen.

11. The clamping mechanism, as set forth in claim 1, wherein the second movable platen selectively abuts said first movable platen.

12. A clamping mechanism of a molding machine having a stationary platen carrying a stationary mold and a guide bar arranged fixedly relative to the stationary platen and defining a longitudinal guiding axis, comprising:
   a first movable platen arranged movably relative to said stationary platen along said guiding axis, and carrying a movable mold;
   a support structure interposed between said guide bar and said first movable platen, and movably supporting said first movable platen on said guide bar along said guiding axis;
   a second movable platen separate from said first movable platen, and arranged movably relative to said stationary platen along said guiding axis;
   a connecting member connecting said first movable platen and said second movable platen to each other; and
   a drive section for applying a drive force to said second movable platen, to move said first movable platen and said second movable platen along said guiding axis;

wherein said support structure comprises a spline engaging surface provided on said guide bar and a ball spline nut provided in said first movable platen, said ball spline nut being operatively engagable with said spline engaging surface; and wherein said second movable platen includes a through-hole receiving said guide bar without engaging with said spline engaging surface.

13. A clamping mechanism of a molding machine having a stationary platen carrying a stationary mold and a guide bar arranged fixedly relative to the stationary platen and defining a longitudinal guiding axis, comprising:

a first movable platen arranged movably relative to said stationary platen along said guiding axis, and carrying a movable mold;

a support structure interposed between said guide bar and said first movable platen, and movably supporting said first movable platen on said guide bar along said guiding axis;

a second movable platen separate from said first movable platen, and arranged movably relative to said stationary platen along said guiding axis;

a connecting member connecting said first movable platen and said second movable platens in a manner shiftable along said guiding axis relative to each other;

a drive section for applying a drive force to said second movable platen, to move said first movable platen and said second movable platen along said guiding axis; and a biasing member interposed between said first and second movable platens, said biasing member elastically biasing said first and second movable platens toward each other along said guiding axis.

14. A clamping mechanism of a molding machine having a stationary platen carrying a stationary mold and a guide bar arranged fixedly relative to the stationary platen and defining a longitudinal guiding axis, comprising:

a first movable platen arranged movably relative to said stationary platen along said guiding axis, and carrying a movable mold;

a support structure interposed between said guide bar and said first movable platen, and movably supporting said first movable platen on said guide bar along said guiding axis;

a second movable platen separate from said first movable platen, and arranged movably relative to said stationary platen along said guiding axis;

a connecting member connecting said first movable platen and said second movable platen to each other; and a drive section for applying a drive force to said second movable platen, to move said first movable platen and said second movable platen along said guiding axis;

wherein said first movable platen is made from a material having a rigidity higher than that of said second movable platen.

* * * * *